United States Patent
Fujii

[11] Patent Number: 6,159,421
[45] Date of Patent: Dec. 12, 2000

[54] METHOD OF CLEANING GASES

[75] Inventor: Toshiaki Fujii, Kanagawa-ken, Japan

[73] Assignee: Ebara Corporation, Tokyo, Japan

[21] Appl. No.: 08/733,146

[22] Filed: Oct. 16, 1996

[30] Foreign Application Priority Data

| Oct. 17, 1995 | [JP] | Japan | 7-293301 |
| Dec. 28, 1995 | [JP] | Japan | 7-352183 |
| Jan. 26, 1996 | [JP] | Japan | 8-031230 |
| Jan. 26, 1996 | [JP] | Japan | 8-031231 |

[51] Int. Cl.$^7$ ................................... A61L 9/20
[52] U.S. Cl. .................. 422/4; 422/24; 422/168; 96/16; 96/69; 55/DIG. 38; 134/1.3; 134/902
[58] Field of Search ................. 422/24, 4, 305, 422/168, 177, 180; 55/DIG. 38; 96/16, 69; 134/1.3, 902

[56] References Cited

U.S. PATENT DOCUMENTS

| 4,750,917 | 6/1988 | Fujii | 55/6 |
| 5,380,503 | 1/1995 | Fujii et al. | 422/243 |
| 5,595,813 | 1/1997 | Ogawa et al. | 428/212 |
| 5,616,532 | 4/1997 | Heller et al. | 502/242 |
| 5,643,436 | 7/1997 | Ogawa et al. | 205/324 |
| 5,650,126 | 7/1997 | Taoda et al. | 422/122 |
| 5,849,200 | 12/1998 | Heller et al. | 210/748 |
| 5,853,866 | 12/1998 | Watanabe et al. | 428/312.8 |
| 5,854,169 | 12/1998 | Heller et al. | 502/242 |

FOREIGN PATENT DOCUMENTS

| 0 241 555 | 10/1987 | European Pat. Off. . |
| 0 560 379 | 9/1993 | European Pat. Off. . |
| 43 03 272 | 8/1994 | Germany . |
| 44 10 476 | 10/1994 | Germany . |
| 1-266864 | 10/1989 | Japan . |
| 3-5859 | 1/1991 | Japan . |
| 5-68910 | 3/1993 | Japan . |
| 5-96125 | 4/1993 | Japan . |
| 5-157284 | 6/1993 | Japan . |
| 7-57981 | 3/1995 | Japan . |
| 2 298 149 | 8/1996 | United Kingdom . |

OTHER PUBLICATIONS

Kuki Seijo (Air Cleaning), vol. 33, No. 1, pp. 16–21, Jan. 1995, Toshiaki Fujii, et al., "Surface Contamination by Organic Compounds in Cleanroom Air".

Database WPI, Derwent Publications, AN 89–354130, JP 01 266 864, Oct. 24, 1989.

Kern, Werner. Handbook of Semiconductor Wafer Cleaning Technology, Noyes Publications (New Jersey): pp. 76, 77, 313, 1993.

*Primary Examiner*—William H. Beisner
*Attorney, Agent, or Firm*—Oblon, Spivak, McClelland, Maier & Neustadt, P.C.

[57] ABSTRACT

Method and apparatus for cleaning a gas for preventing the contamination of a surface of a substrate in a localized space are disclosed. A photocatalyst is provided in a selected area of the localized space and the photocatalyst, as it is illuminated with light, is contacted by the gas to be treated, whereby any noxious gases are removed from the treated gas. Alternatively, a unit apparatus composed of an ultraviolet radiation source, a photocatalyst, a photoelectron emitter and an electrode is installed in a selected area of the localized space and the gas to be treated is passed through the unit apparatus, whereby noxious gases and particulates are removed from the treated gas.

40 Claims, 15 Drawing Sheets

METHOD OF CLEANING GASES

BACKGROUND OF THE INVENTION

This invention relates to a method and an apparatus for cleaning gases in order to prevent contamination of substrate surfaces within localized spaces, particularly for preventing the contamination of substrate surfaces such as those starting materials, semi-finished products and finished products in areas of advanced technology such as semiconductor and liquid crystal fabrication.

The method and apparatus of the invention for cleaning gases are applicable to the following areas: spaces within cleanrooms as in semiconductor fabrication plants, liquid crystal fabrication plants and precision machine manufacturing plants, clean boxes, valuables storages, wafer stockers (wafer boxes), closed spaces for the transport of valuables, clean closed spaces and transport spaces in the presence of various gases or under reduced pressure or in vacuo, spaces containing gases to be supplied to cleaning apparatus, and spaces for access to apparatus for supplying air to create an air knife, as well as to interface apparatus.

Two kinds of contaminants are of concern to cleanrooms in semiconductor fabrication plants and they are fine particles (particulates) and gaseous substances such as non-methane as hydrocarbons (HC) that are present in air at extremely low concentrations due to automotive exhaust emissions and the outgassing of various resin products widely used in consumer applications.

The filters installed in cleanrooms are incapable of HC removal, so the HCs in the external air will be brought into the cleanrooms. However, extremely low concentrations of HCs in normal air (both within and outside the room) can be a contaminating harmful gaseous substance and hence need be removed. Recently, the outgassing of high-molecular weight resins which are constituent material of cleanrooms is also a problematic source of HC generation. Since the cost performance of the present-day large-scale cleanrooms is relatively low, the future cleaning technology will see it necessary that localized spaces (control spaces at a reduced scale) should be cleaned with high efficiency. However, high-molecular weight materials such as plastics, sealants and adhesives will be used in greater amounts in localized spaces than in the present-day cleanrooms and the outgassing of HCs from these high-molecular weight materials will be a contamination source of concern. The various solvents (e.g. alcohols and ketones) used during operations in cleanrooms evolve HCs, which are also contaminants of concern at increased concentrations.

Thus, two sources exist for the generation of HCs in cleanrooms and the HCs brought into the room from the external air are combined with the HCs generated within the room, whereby the concentration of HCs in the cleanroom is sufficiently higher than that in the external air to contaminate substrate surfaces.

If fine particles (particulates) deposit on the substrate surfaces of wafers, semi-finished products or finished products, interconnections in the conductor patterns may break or shorting may occur to produce defects in the circuit. The HC deposit on the substrate can also reduce its compatibility for the resist, causing unevenness in the thickness of the resist film or deterioration in its adhesion to be substrate. Therefore, the HCs as contaminants will reduce the production rate (yield) of semiconductor devices. In the latest type semiconductor fabrication plants, the rate of air circulation within cleanrooms is increased for the purpose of energy saving and this causes the HCs in the cleanroom to be concentrated to much higher levels than in the external air; as a result, the HCs will deposit on semiconductor substrates to contaminate their surfaces.

The degree of this surface contamination can be expressed by contact angle on substrates and severe contamination produces a large contact angle. Substrates with large contact angles permit film formation but the adhesion of the film is so weak that the yield of fabrication will be reduced. The term "contact angle" as used herein refers to the angle of contact by wetting with water and represents the degree of contamination of the substrate surface. If a hydrophobic (oily) substance deposits on the substrate, its surface repels water and will not be easily wetted. Then, the angle of contact between the substrate surface and a waterdrop will increase. In other words, a large contact angle means a high degree of contamination and vice versa.

Conventional methods of purifying the air in cleanrooms comprise (1) mechanical filtration (with, for example, HEPA filters) and (2) electrical filtration by electrostatic trapping of fine particles (particulates) with charged or electroconductive filters (e.g. HESA filters) under high voltage. Either method is intended for removing fine particles (particulates) and ineffective for removing gaseous contaminants such as non-methane HCs which will increase the contact angle.

Known methods for removing HCs as gaseous contaminants include pyrolysis and ozonolysis but none of these methods are effective for removing HCs that are present at extremely low concentrations in the air introduced into cleanrooms.

The present inventors already proposed methods and apparatus for preventing the contamination of substrate surfaces by means of adsorbents or absorbers which were capable of preventing the increase in contact angle (Japanese Patent Public Disclosure Nos. 157284/1993, 324/1994 and 8752/1995). These proposals were found to have the problem of waste generation from the adsorbents or absorbers used to remove HCs, so the inventors proposed a method and an apparatus characterized by the use of dust removing means and means of decomposing hydrocarbons with the aid of photocatalysts (Japanese Patent Public Disclosure No. 57981/1995). The proposal is effective in certain application areas but needs further improvements in order to enhance its practical feasibility in cleanrooms.

SUMMARY OF THE INVENTION

An object, therefore, of the present invention is to provide a method by which HCs that will increase the angle of contact with substrate surfaces and which comprise not only HCs that are carried by the air to be brought into cleanrooms but also HCs that are generated in the cleanrooms can be effectively and conveniently removed or converted to HCs that will not contribute to the increase of contact angle.

Another object of the invention is to provide an apparatus for implementing the method.

The first object of the invention can be attained by a method of cleaning a gas for preventing the contamination of a surface of a substrate in a localized space, in which a photocatalyst is provided within said space over a surface area of 50–50,000 $cm^2$ per cubic meter of the space, said gas containing hydrocarbons is brought into contact with said photocatalyst as it is illuminated with light, whereby the concentration of non-methane hydrocarbons in said gas is reduced to 0.2 ppm and below before said gas is exposed to a surface of said substrate. In a particular case, the localized space is a cleanroom, part of which is preferably composed of an organic matter. The source of illuminating light may be a fluorescent lamp. A preferred photocatalyst is $TiO_2$, which may optionally be doped with at least one member of the group consisting of Pt, Ag, Pd, $RuO_2$ and $Co_3O_4$. In another preferred embodiment, the photocatalyst is formed as a thin film on a surface of the light source to be an integral part of the latter.

The second object of the invention can be attained by an apparatus for cleaning a gas containing both noxious gases and fine particulates, which is a unitary assembly of at least an ultraviolet radiation source, a photocatalyst, a photoelectron emitter and an electrode, said ultraviolet radiation source being enclosed with the photocatalyst, the photoelectron emitter and the electrode, said apparatus being installed within a space filled with said gas to be cleaned.

The present invention has been accomplished on the basis of the following four findings.

(1) Ordinary air (external air) contains harmful gaseous components consisting of acidic gases such as NOx, SOx and HCl, alkaline gases such as ammonia and amine, and hydrocarbons (HCs). These harmful gaseous components will be brought into cleanrooms without being entrapped by internal filters. Compared at the concentration levels in ordinary air, HCs make the greatest contribution to the increase in the angle of contact with substrates such as wafers [KUKI SEIJO (Cleaning of Air), Vol. 33, No. 1, pp. 16–21, 1995].

(2) In a cleanroom at least part of which is composed of an organic matter (e.g. high-molecular weight resin), extremely low concentrations of organic gases (e.g. HCs) will be generated from the organic matter to contaminate the contents of the cleanroom (e.g. raw materials such as wafers and glass substrates, as well as semi-finished products). Cleanrooms use, at least in part, organic materials and members (e.g. plants containers, packings, sealants, adhesives and sidewall materials) and extremely small amounts of organic gases will be released from these organics. For example, siloxane is released from the sealants and phthalate esters from the plastics of which the containers vessels are made. The generation of these organic gases is extremely small but they are confined within the closed cleanroom. This phenomenon is common-place in the latest type of cleanrooms where airflows are recirculated in order to achieve energy saving. As a result, the concentration of organic gases will increase gradually until they deposit on the contents of the room to affect them adversely. Thus, the HCs within cleanrooms consist not only of those which are brought in from the external air but also the HC gas that is generated within the room. Containing such multi-component and concentrated HCs, the latest types of cleanrooms are often described as HC-rich "dirty rooms" and require an effective method of treating HCs.

(3) In the areas of advanced technology to which the present invention is applicable, the removal of particulates has so far sufficed to ensure the fabrication of satisfactory products but the recent increase in quality and precision has rendered them sensitive to gaseous substances, particularly HCs.

(4) Non-methane hydrocarbons are contaminants if they are present at concentrations encountered in ordinary air (both within and outside the room). While various kinds of non-methane hydrocarbons exist, the components that are responsible for an increased contact angle would depend on the type of substrate (e.g. wafer or glass material), as well as the type and properties of thin films on the substrate. As a result of the intensive studies made by the present inventors, it has been found that the objects of the invention can effectively be attained by removing the non-methane hydrocarbons to concentrations of 0.2 ppm or below, preferably 0.1 ppm or below, with the aid of a photocatalyst.

DETAILED DESCRIPTION OF THE INVENTION

The present invention will now be described in detail with reference to the accompanying drawings.

Cleaning with the Photocatalyst

The first aspect of the invention is a method of cleaning organic gases to prevent contamination in a localized space, which is characterized in that part of said localized space is composed of a photocatalyst and that said photocatalyst is illuminated with light.

Figure 1:
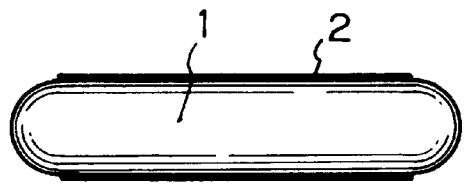
FIG. 1 shows schematically a photocatalyst formed on a surface of a light source according to the invention.

FIG. 1 shows schematically the essential parts of a cleaner that may be used to implement the method according to the first aspect of the invention. As shown, a light source 1 has its surface coated with a thin film of a photocatalyst 2 as an integral part of the light source 1. The cleaner may use an ultraviolet lamp as the light source 1 and $TiO_2$ as the photocatalyst 2. The photocatalyst 2 absorbs the light from the source 1 to cause photocatalysts. As an alternative to the monolithic system shown in FIG. 1, a photocatalyst having a surface area of 50–50,000 $cm^2$ per cubic meter of a closed space may be provided separate from the light source and illuminated with the incident light.

The photocatalyst may be of any type that is excited by light illumination to ensure that organic gases (non-methane hydrocarbons) that contribute to the increase of contact angle are either decomposed to non-contributory forms or converted to stable forms that may be deposited on the substrate surface without adverse effects. Semi-conductor materials are generally preferred since they are effective, easily available and easy to process. From the viewpoints of effectiveness and economic feasibility, either one of Se, GE, Si, Ti, Zn, Cu, Al, Sn, Ga, In, P, As, Sb., C, Cd, S, Te, Ni, Fe, Co, Ag, Mo, Sr, W, Cr, Ba and Pb is preferred; also preferred are compounds, alloys or oxides of these elements. These photocatalysts may be used either individually or in combination. Exemplary compounds are AlP, AlAg, GaP, AlSp, GaAs, InP, GaSp, InAs, InSb, CdS, CdSe, Zns, $MoS_2$, $WTe_2$, $Cr_2Te_3$, MoTe, $Cu_2S$ and $WS_2$, and exemplary oxides are $TiO_2$, $Bi_2O_3$, CuO, $Cu_2O$, ZnO, $MoO_3$, $InO_3$, $Ag_2O$, PbO, $SrTiO_3$, $BaTiO_3$, $Co_3O_4$, $Fe_2O_3$ and NiO.

In order to improve their photocatalytic action, the above listed materials may be doped with Pt, Ag, Pd, $RuO_2$, $Co_3O_4$ and the like. Upon addition of these substances, HCs can be decomposed by the photocatalyst at an accelerated rate. The dopants listed above may be added either individually or in combination. The dopants are typically added in amounts of 0.01–10 wt % and their concentration can be determined on the basis of preliminary experiments that take into account their type and the performance required. The dopants may be added by a suitable method selected from among well known techniques such as impregnation, photoreduction, sputtering and kneading.

The photocatalyst may be fixed in a unitary assembly by being coated onto, embedded in or sandwiched between layers of materials of suitable shapes such as a plate, a fluffy mass, a mesh, a honeycomb, a membrane, a sheet and a fiber. For example, the photocatalyst may be fixed to ceramics, fluoroplastics and glass materials by well known techniques such as a sol-gel method, sintering, evaporation and sputtering. In a typical case, $TiO_2$ may be fixed to a glass material or alumina plate by a sol-gel method.

If desired, the photocatalyst may be formed as an integral part of the light source and to this end, a well known fixing technique may be adopted such as a sol-gel method, sintering, evaporation and sputtering. If the photocatalyst is an integral part of the light source, it must absorb the light from the source such that not only the side facing the light source but also the side remote from the light source is activated by excitation and, hence, the photocatalyst must be in a film form that is thin enough to permit the light from the lamp to effectively reach the side of the film which faces away the lamp.

If the photocatalyst is provided in a closed space over a surface area of at least 10 $cm^2$ per cubit meter of the space, hydrocarbons in the space will make successive contact with the photocatalyst to undergo effective decomposition. Particularly good results are attained if the photocatalyst is provided over a surface area of at least 50 $cm^2$ per cubic meter of the space. The greater the surface area over which the photocatalyst is provided, the more effective it is. However, the surface area of the photocatalyst is limited by other factors such as cost and the need for services; a surface area preferred in practical applications ranges from 50 to 50,000 $cm^2$, with the range of 100–10,000 $cm^2$ being more preferred.

The photocatalyst may be provided in one or more locations on the sidewall or ceiling portion of the closed space.

The light source may be of any type that allows the photocatalyst to exhibit photocatalysts upon illumination with light. Photocatalytic decomposition of HCs can be initiated by bringing the gas of concern into contact with the photocatalyst as the latter is illuminated with light in an absorption (frequency) range that is associated with the specific type of photocatalyst. The light absorption ranges of typical photocatalysts are set forth below in nanometers: Si<1100, Ge<1825, Se<590, AlAs<517, AlSb<827, GaAs<886, InP<992, InSb<6888, InASs<3757, CdS<520, CdSe<730, MoS$_2$<585, ZnS<335, TiO$_2$<415, ZnO<400, Cu$_2$O<625, PbO<540 and Bi$_2$O$_3$<390.

The light source preferably employs visible or ultraviolet light, the latter case being particularly preferred. Ultraviolet light may be emitted from a mercury lamp, a hydrogen discharge lamp, a Lyman discharge, a xenon discharge lamp or the like depending upon the absorption range for the photocatalyst. A mercury lamp is generally preferred from the viewpoints of cost, effectiveness and simplicity in shape.

Typical examples of organic gases (HC) that increase the contact angle are high-molecular weight HCs of $C_{16}$–$C_{20}$ such as phthalate esters and phenol derivatives of higher aliphatic acids. While the action of these organic gases varies with the type of the substrate (e.g. wafer or glass plate) or the overlying thin film, as well as their properties, the following postulation may be put forth according to the studies conducted by the present inventors: the organic gases (HCs) that increase the angle of contact with substrate surfaces in ordinary cleanrooms are mostly comprised of those having high molecular weights, which are characterized by the structure having —CO and —COO bonds (having hydrophilicity). The HCs at issue may be regarded as hydrophobic substances having such hydrophilic portions (—CO and —COO bonds), with hydrophobicity being assumed by —C—C— in the basis structure of HC. The —CO and —COO bonds in the organic gases combine with the OH groups on the wafer or glass surface by hydrogen bonding, with the hydrophobic portion facing away; as a result, the wafer or glass surface becomes hydrophobic and the film deposited on the surface will adhere only weakly due to an increased contact angle.

When the photocatalyst is placed in an atmosphere containing organic gases, the latter will first be adsorbed on the surface of the photocatalyst as in the case where it is deposited on the wafer or glass surface; then, the —CO and —COO bonds which are the active portions of the organic gases are converted to a stable form by photocatalysis that occurs upon illumination of the photocatalyst with light. As a consequence, the organic gases becomes sufficiently stable that they will not deposit on the wafer or glass substrate or, even if they are deposited, no hydrophobicity will be exhibited. In other words, the high-molecular weight organic gases are converted to low-molecular weight gases by photocatalysis.

Typical sources of generation of the organic gases that contaminate substrates are plasticizers, mold releases and antioxidants in plastic products used within cleanrooms [KUKI SEIJO (Cleaning of Air), Vol. 33, No. 1, pp. 16–21, 1995].

The present invention is applicable not only to the air within ordinary cleanrooms but also to various other gases such as nitrogen and argon. The invention is equally applicable to the case of removing unacceptably high concentrations of impurities like non-HC harmful gaseous substances such as malodorous components that contain NOx, NH$_3$, S and N. To take an example, acidic or alkaline substances may exist in high concentrations within a cleanroom as a result of the entrance of NOx and NH$_3$ which are generated in the step of cleaning with the acidic or alkaline substances. Depending on their concentration, these gaseous contaminants may contribute to an increased contact angle. Even in this case, the gaseous contaminants can be treated by the action of the photocatalyst. For example, NOx is oxidized to nitric acid, which is trapped and removed to produce a clean gas that will not increase the angle of contact with the substrate surface.

If the environment in which the cleaning apparatus according to the second aspect of the invention is to be employed has high concentrations of not only harmful gases but also particulates, the well known filtration technique or the particulate removing system using photoelectrons as already proposed by the present inventors (as in Japanese Patent Publication No. 5859/1991, as well as Japanese Patent Public Disclosure Nos. 171061/1992 and 138070/1993) may also be employed. If the concentration of fine particles (particulates) is high, the apparatus of the invention may be such that the fine particles deposit on the surface of the photocatalyst to deteriorate its performance. In this case, it is desirable to remove the fine particles, as well as the noxious gaseous components.

The closed space to which the invention is to be applied is also called a "localized space" and it is basically a closed space or system. The term "basically" is used to include a space that permits a certain amount of gas entry or discharge due to leakage. The space under consideration may be atmospheric, superatmospheric or subatmospheric including vacuum.

Figure 2:
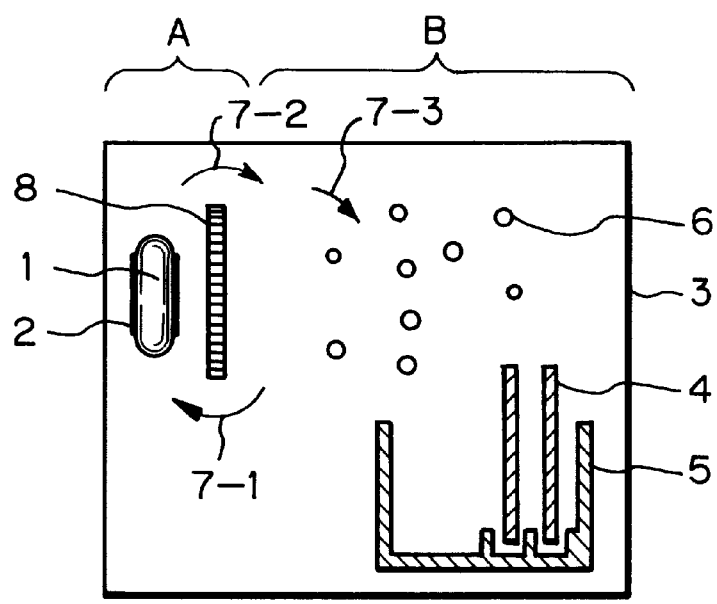
FIG. 2 shows schematically a wafer stocker having the apparatus of the invention installed in accordance with one embodiment.

FIG. 2 shows schematically a wafer storage or stocker that is to be installed in a class 10 localized high-efficiency cleaning zone in a class 10,000 cleanroom at a semiconductor fabrication plant. The cleanroom contains not only the HCs brought from the external air but also 1.0–1.5 ppm of non-methane hydrocarbons which are the product of outgassing the constituent materials of the cleanroom. Hence, the wafer storage or stocker 3 is installed within the cleanroom in order to prevent HC contamination of wafers. Each time a wafer carrier 5 containing a plurality of wafers 4 is moved into or out of the storage 3 (i.e., each time the access door on the storage 3 is opened and closed), non-metallic hydrocarbons (HCs) 6 will be released from the cleanroom to enter the storage 3. An ultraviolet lamp 1 has a thin film of a photocatalyst (TiO$_2$) 2 deposited on the surface to make a device A in which the photocatalyst is an integral part of the light source and the HCs are decomposed with this device A in the following manner. When the storage 3 is opened or closed, part of the HCs present in the cleanroom at a concentration of 1.0–1.5 ppm is transferred into the storage 3 and the air containing the HCs flows unidirectionally, forming airflows 7-1, 7-2 and 7-3, as it contacts the photocatalyst 2 in the device A, whereupon the HCs are decomposed to 0.2 ppm or below, preferably 0.1 ppm or below. A slight temperature difference is created between the top and the bottom of the photocatalyst illuminated with the ultraviolet light from the lamp 1, whereupon the air in the storage 3 both ascends and descends to produce a circulating flow, thereby making successive contact with the photocatalyst 2 to accomplish effective processing of the HCs. Shown by 8 is a light shield which ensures that even a slight amount of ultraviolet light leaking from the lamp 1 will not illuminate the wafers 4. In this way, a space B containing the wafers (substrates) to be protected against contamination is effectively cleaned.

Figure 3:
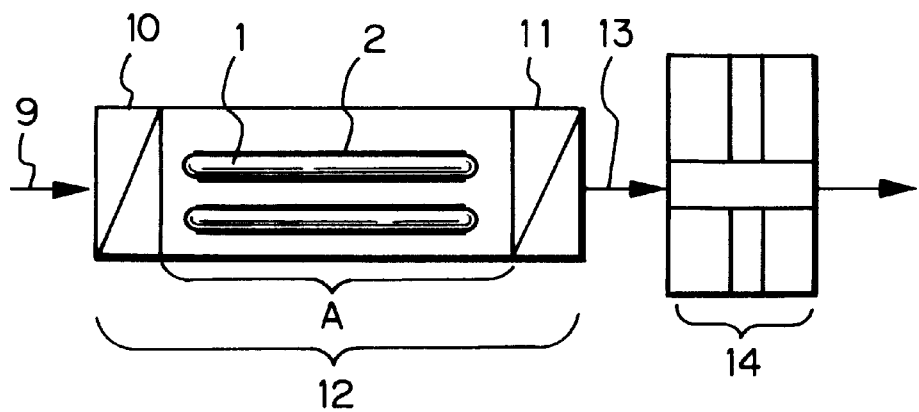
FIG. 3 shows the process by which the air to be supplied to form an air knife in a cleanroom is cleaned with the apparatus of the invention.

FIG. 3 shows the case where the invention is applied in order to clean the air which is supplied to create an air knife in a class 1,000 cleanroom at a semiconductor fabrication plant. Air 9 in the cleanroom is processed with a contamination control system 12 comprising a prefilter 10, a photocatalyst 2 for decomposing HCs, ultraviolet lamps 1 for illuminating the photocatalyst with ultraviolet light, and a dust removing filter 11. The air 9, as it passes through the system 12, is freed of dust particles and has the HCs decomposed, so that clean air 13 exits the system 12 to be supplied into an air knife apparatus 14 for cleaning wafers.

The cleanroom contains not only the HCs brought from the external air but also 1.1–1.3 ppm of HCs which are the product of outgassing of the constituent materials of the cleanroom. Hence, the air 9 is first freed of coarse dust particles by means of the prefilter 10. The prefilter 10 is provided in order to ensure that any coarse dust particles generated in the cleanroom will not deteriorate the performance of the photocatalyst due to physical contamination. Subsequently, the HCs are decomposed to 0.2 ppm or below, preferably 0.1 ppm or below by means of a device A which comprises two rod-shaped ultraviolet lamps 1 each having a thin film of $TiO_2$ attached as a photocatalyst 2 to the surface. As a result, high molecular weight HCs and active HCs which both will contribute to an increased contact angle are decomposed either to HCs of insufficient molecular weights to increase the contact angle or carbon dioxide and water, depending upon the type of HCs to be treated. The dust removing filter 11 is provided to achieve efficient trapping of fine particles within the cleanroom at a concentration equivalent to class 1,000 or those fine particles which flow out of the HC decomposing section or areas around it in an emergency. The dust removing filter 11 is in the form of an ULPA filter which is capable of removing the fine particles to a class 10 or below. In this way, clean air 13 is obtained that will not increase the angle of contact with the substrate and it is subsequently supplied into the air knife apparatus 14.

Figure 4:
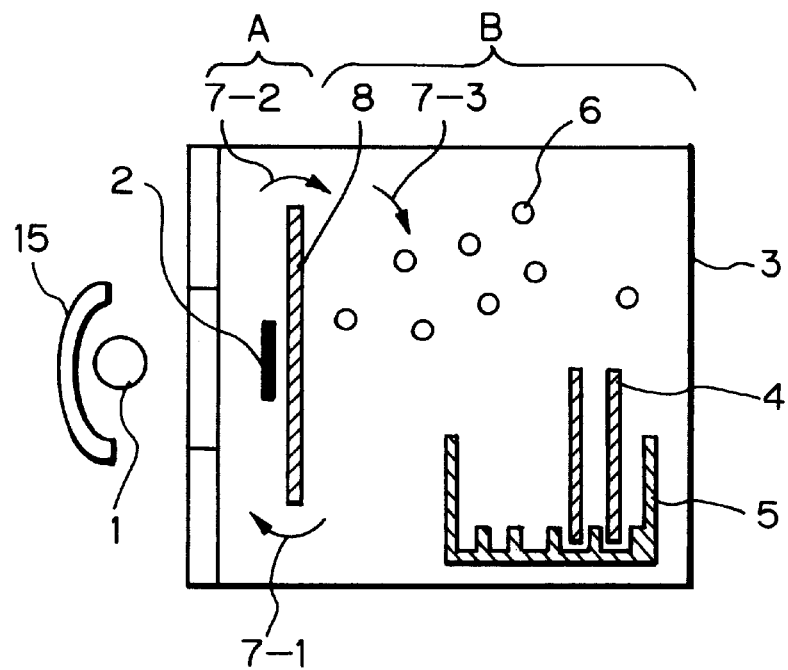
FIG. 4 shows schematically a wafer stocker having the apparatus of the invention installed according to another embodiment.

FIG. 4 shows a wafer stocker 3 installed in a class 10 localized high-efficiency air cleaning zone in a class 10,000 clean room at a semiconductor fabrication plant. The wafer stocker 3 consists of section A where HCs are decomposed with the aid of a photocatalyst according to the invention and section B where wafers are stored, or a space filled with the air to be cleaned. The cleanroom contains not only the HCs brought from the external air but also 1.0–1.5 ppm of non-methane hydrocarbons which are the product of outgassing of the constituent materials of the cleanroom. This is why the wafer storage 3 is installed within the cleanroom in order to prevent HC contamination of wafers. Each time a wafer carrier 5 containing a plurality of wafers 4 is moved into or out of the storage 3 (i.e., each time the access door on the storage 3 is opened or closed), non-metallic hydrocarbons (HCs) 6 will be released from the cleanroom to enter the storage 3. The HCs 6 are decomposed with the aid of the photocatalyst 2 as it is illuminated with an ultraviolet lamp 1, whereby the air in the space B containing the wafers 4 is cleaned. To be more specific, when the storage 3 is opened or closed, part of the HCs present in the cleanroom at a concentration of 1.0–1.5 ppm is transferred into the storage 3 and the air containing the HCs flows unidirectionally, forming airflows 7-1, 7-2 and 7-3, as it contacts the photocatalyst 2 in the HC decomposing section A, whereupon the HCs are decomposed to 0.2 ppm or below, preferably 0.1 ppm or below, in terms of non-methane HCs. A slight temperature difference is created between the top and the bottom of the photocatalyst 2 illuminated with the ultraviolet light from the lamp 1, whereupon the air in the storage 3 both ascends and descends to produce a circulating flow, thereby making successive contact with the photocatalyst 2 to accomplish effective processing of the HCs. As a result, high-molecular weight HCs and active HCs that will contribute to an increased contact angle are decomposed either to HCs of insufficient molecular weights to increase the contact angle or carbon dioxide and water. Shown by 8 is a light shield which ensures that even a slight amount of ultraviolet light leaking from the lamp 1 will not illuminate the wafers 4. Shown by 15 is a reflecting surface 15 which reflects the ultraviolets radiation from the lamp 1 such that it effectively illuminates the photocatalyst 2. In this way, the space B containing the wafers (substrates) 4 is effectively cleaned. The photocatalyst 2 used in the illustrated case comprises an aluminum plate having a thin $TiO_2$ film attached thereto and it is provided over a surface area of 1,000 $cm^2$ per cubic meter of the space.

Figure 5:
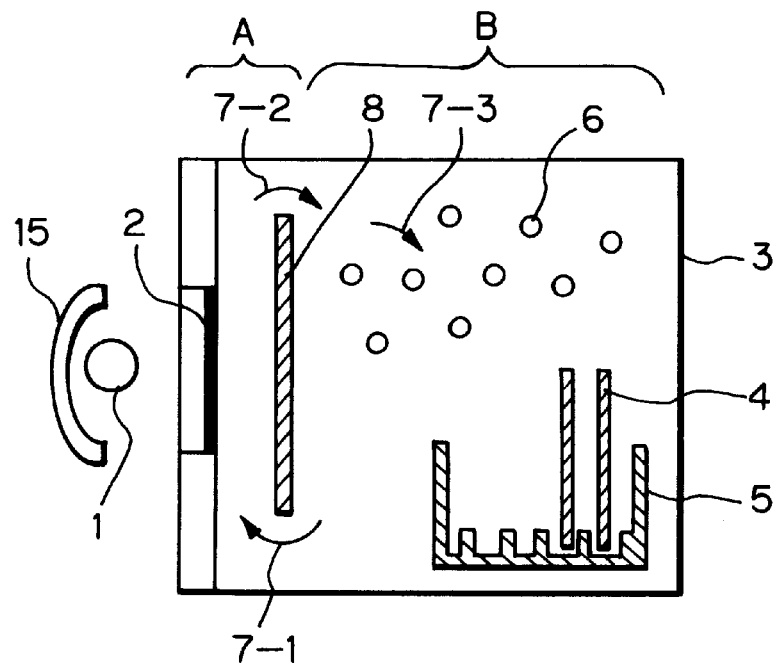
FIG. 5 shows schematically a wafer stocker having the apparatus of the invention installed according to yet another embodiment.

FIG. 5 shows a modification of the apparatus shown in FIG. 4, which is characterized by forming the photocatalyst 2 of a quartz glass plate having a thin $TiO_2$ film attached thereto. The photocatalyst 2 shown in FIG. 5 is provided over a surface area of 2,000 $cm^2$ per cubic meter of the space.

Figure 6:
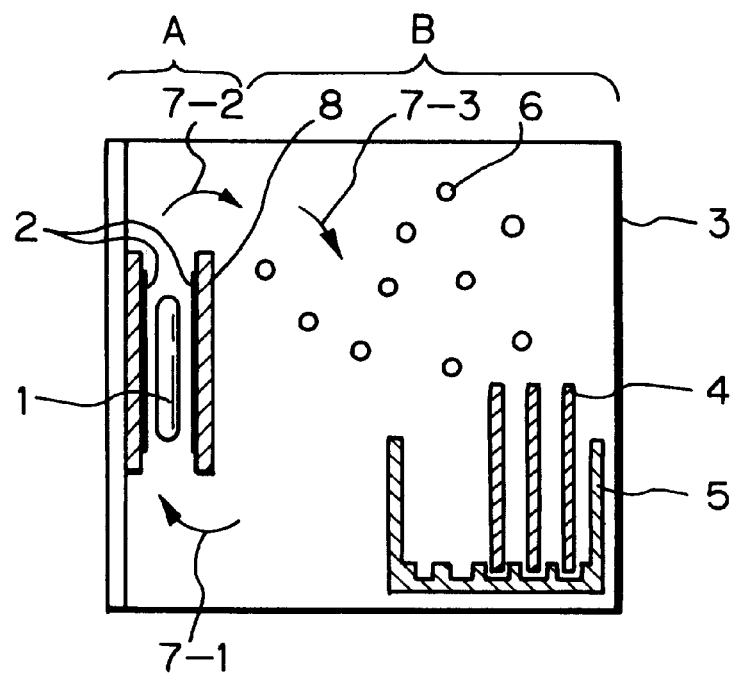
FIG. 6 shows schematically a wafer stocker having the apparatus of the invention installed according to a further embodiment.

FIG. 6 shows another modification of the apparatus shown in FIG. 4, which is characterized in that the photocatalyst 2 is formed of a fluoroplastic sheet having a thin $TiO_2$ film attached thereto and that the ultraviolet lamp 1 is provided within the stocker 3. The photocatalyst 2 shown in FIG. 6 is provided over a surface area of 4,000 $cm^2$ per cubic meter of the space.

Figure 7:
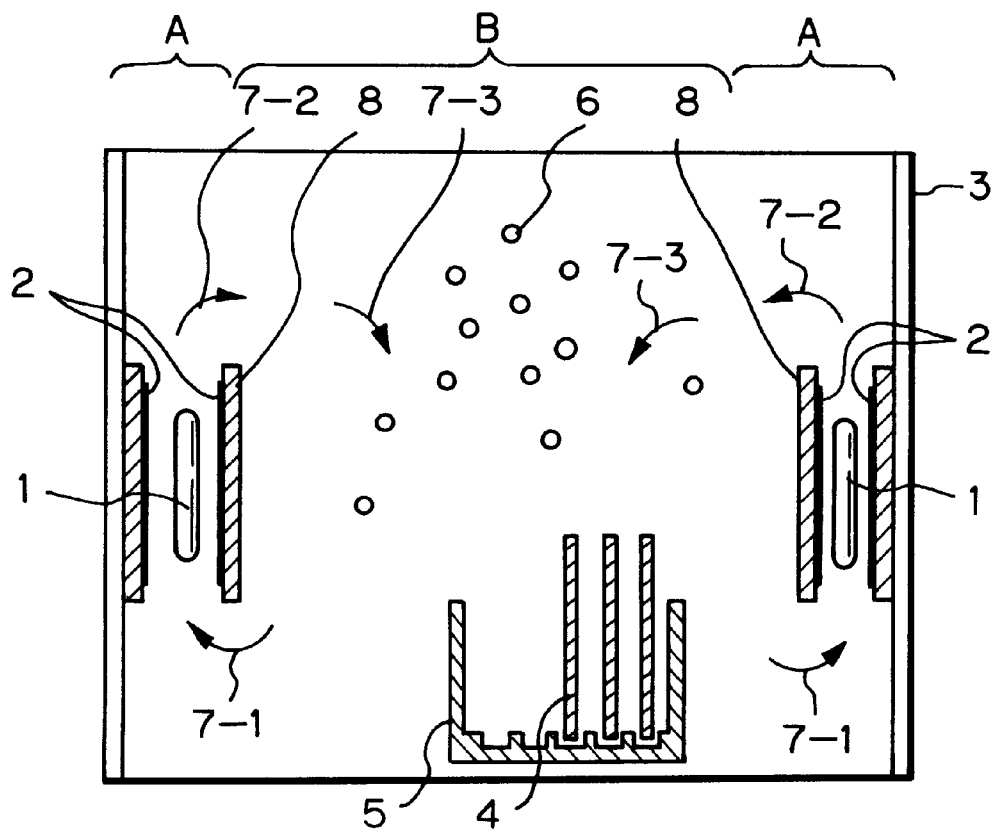
FIG. 7 shows schematically a wafer stocker having the apparatus of the invention installed according to a still further embodiment.

FIG. 7 shows a modification of the apparatus shown in FIG. 6, which is characterized by providing the photocatalyst 2 on two sidewalls of the wafer stocker 3. The photocatalyst 2 shown in FIG. 7 is provided over a surface area of 10,000 $cm^2$ per cubic meter of the space.

Figure 8:
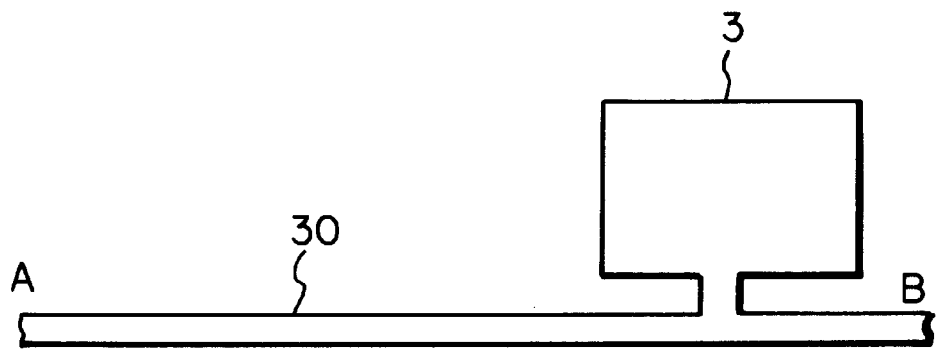
FIG. 8 shows schematically the step of wafer transfer in a cleanroom.

FIG. 8 shows schematically how wafers are transported in the process of semiconductor fabrication within a class 100,000 cleanroom (the cleanliness level is not very high). Individual wafers are transported by a transport system 30 from step A to B, with a wafer stocker 3 being provided between the two steps.

Figure 9:
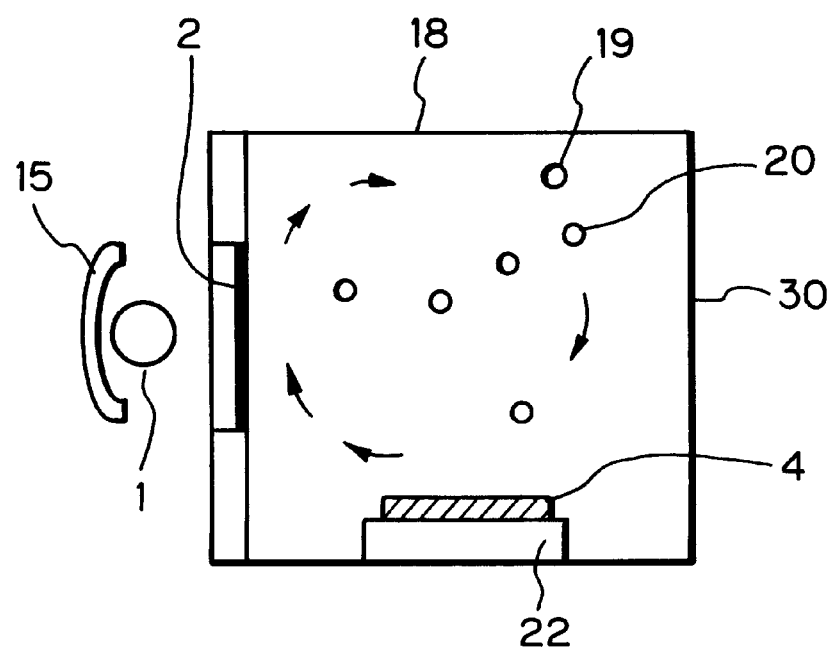
FIG. 9 shows schematically a wafer transport system having the apparatus of the invention installed according to another embodiment.

FIG. 9 shows a cross section of the transport system 30. As shown, the photocatalyst 2 made of a thin $TiO_2$ film is coated on a glass plate in a sidewall of the transport system 30 defining a localized space. The transport system 30 comprises a drive unit 22 for transporting wafers 4, a photocatalyst 2, a mercury lamp 1, an ultraviolet light reflecting surface 15, as well as sidewalls, the ceiling and the floor, which are collectively referred to by 18. Organic gases 19 in the transport system 30 that increase the contact angle are illuminated with the mercury lamp 1 such that they are catalyzed by the photocatalyst 2 to be converted to low-molecular weight gases 20 that will not increase the contact angle. When the photocatalyst 2 is illuminated with ultraviolet light, a slight temperature difference is created between the top and the bottom of the photocatalyst 2, whereupon the air in the transport device 30 both ascends and descends to produce a circulating flow, thereby making successive contact with the photocatalyst to accomplish effective processing of the HCs. The arrows given in FIG. 9 represent airflows. The organic gases that will increase the contact angle are estimated to be the silicone seal and plastics in constituent materials of and equipment in the cleanroom, as well as phthalate esters and higher aliphatic acids released from the sealing and packing materials in the transport system.

Figure 10:
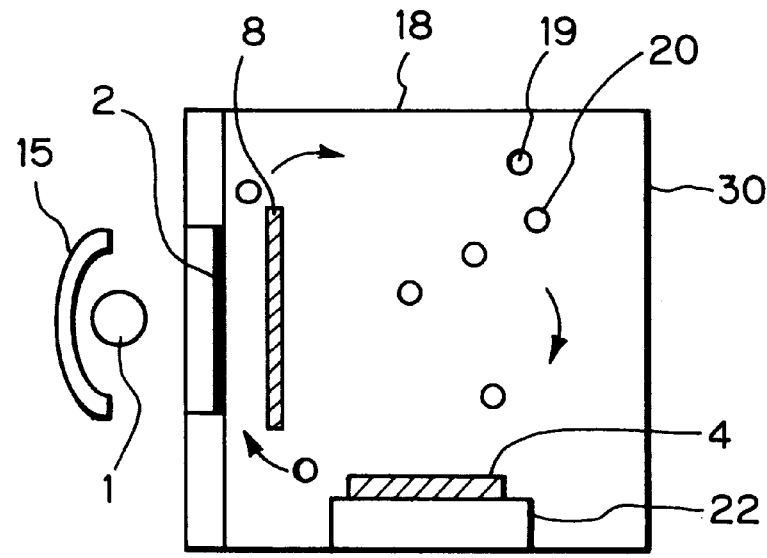
FIG. 10 shows schematically a wafer transport system having the apparatus of the invention installed according to yet another embodiment.

FIG. 10 shows a modification of the apparatus shown in FIG. 9, which is characterized by providing a light shield 8 in order to insure that the ultraviolet light from the lamp 1 will not illuminate wafers.

Figure 11:
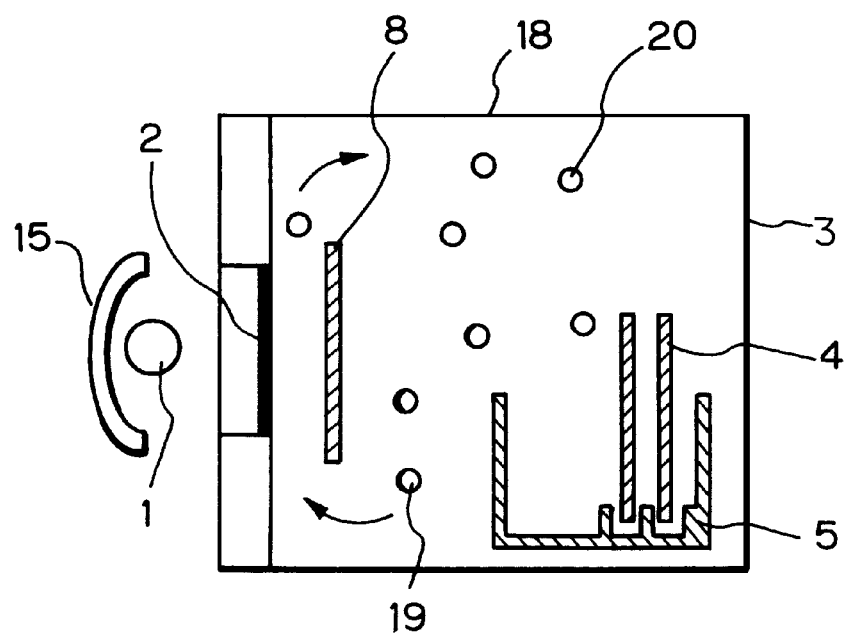
FIG. 11 shows schematically a wafer stocker having the apparatus of the invention installed according to a further embodiment.

FIG. 11 shows internal construction of the wafer stocker 3 shown in FIG. 8. As shown, a plurality of wafers 4 are contained in the wafer carrier 5 that can be moved into or out of the stocker 3. The photocatalyst 2 is provided in a sidewall 18 to be illuminated with ultraviolet light from the lamp 1. Since a packing material (plastics) and a sealant are used as constituent materials of the stocker 3, organic gases 19 that would increase the contact angle if they were deposited on the wafer will be generated in extremely small quantities but such gases are treated with the aid of the photocatalyst 2 to become innocuous. Depending on the operating conditions, the air in the cleanroom which contains non-methane hydrocarbons that will increase the contact angle may enter the stocker 3 but this is similarly treated to become innocuous.

Figure 12:
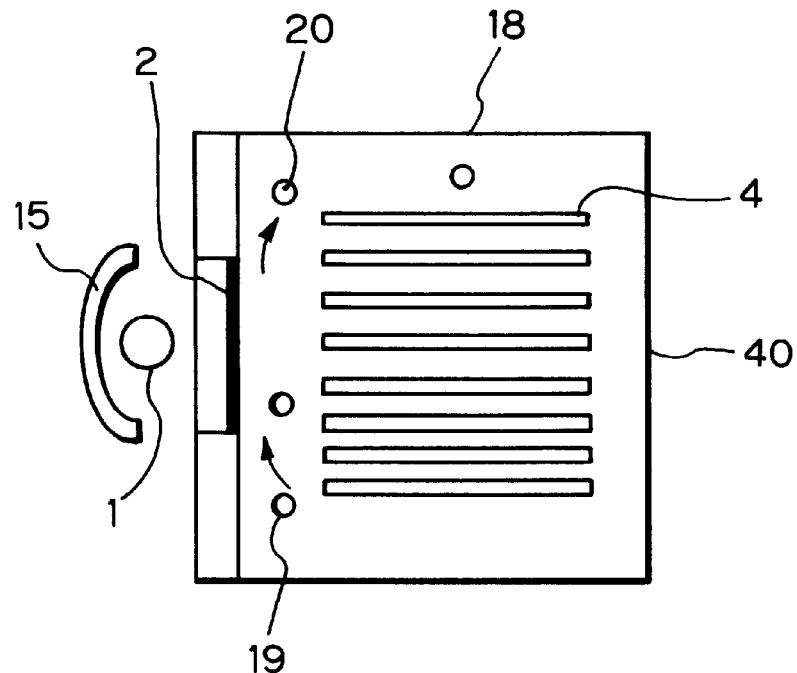
FIG. 12 shows schematically a wafer cassette having the apparatus of the invention installed according to a still further embodiment.

FIG. 12 shows a wafer cassette moving through a plurality of film deposition apparatus in a class 100,000 cleanroom. The wafer cassette 40 containing wafers 40 is successively moved through the film deposition apparatus as the desired film is deposited on the individual wafers. As shown, photocatalyst 2 is provided in part of a sidewall 18 of the wafer cassette 40 and illuminated with ultraviolet light from an ultraviolet lamp 1. The photocatalyst 2 comprises a glass plate coated with a thin $TiO_2$ film. The wafer cassette is made of a plastic material and generates a very small amount of organic gases 19 but these gases are processed with the aid of the photocatalyst 2 such that they are converted to innocuous gases 20.

Figure 13:
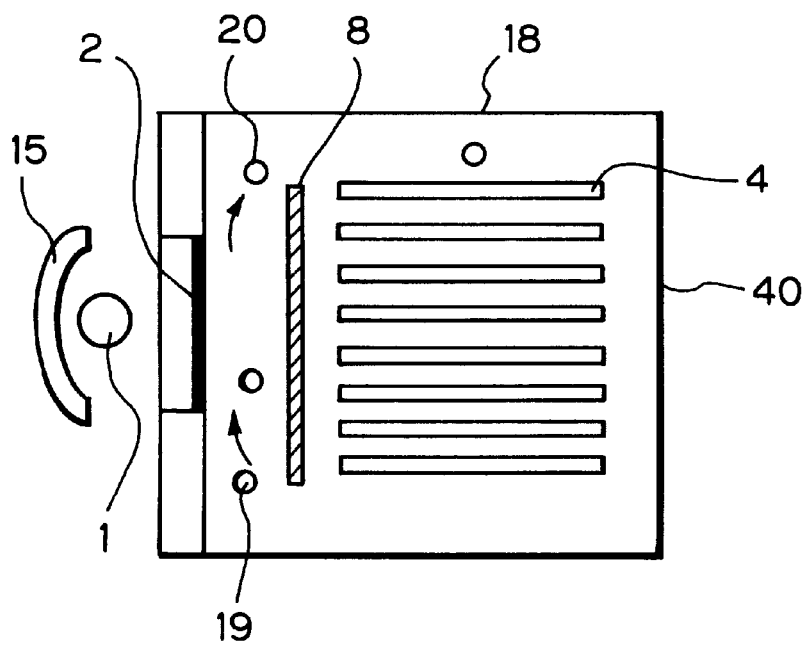
FIG. 13 shows schematically a wafer cassette having the apparatus of the invention installed according to yet another embodiment.

FIG. 13 shows a modification of the apparatus shown in FIG. 12, which is characterized by providing a light shield 8 to ensure that wafers 4 will not be illuminated with ultraviolet light from the lamp 1.

Figure 14:
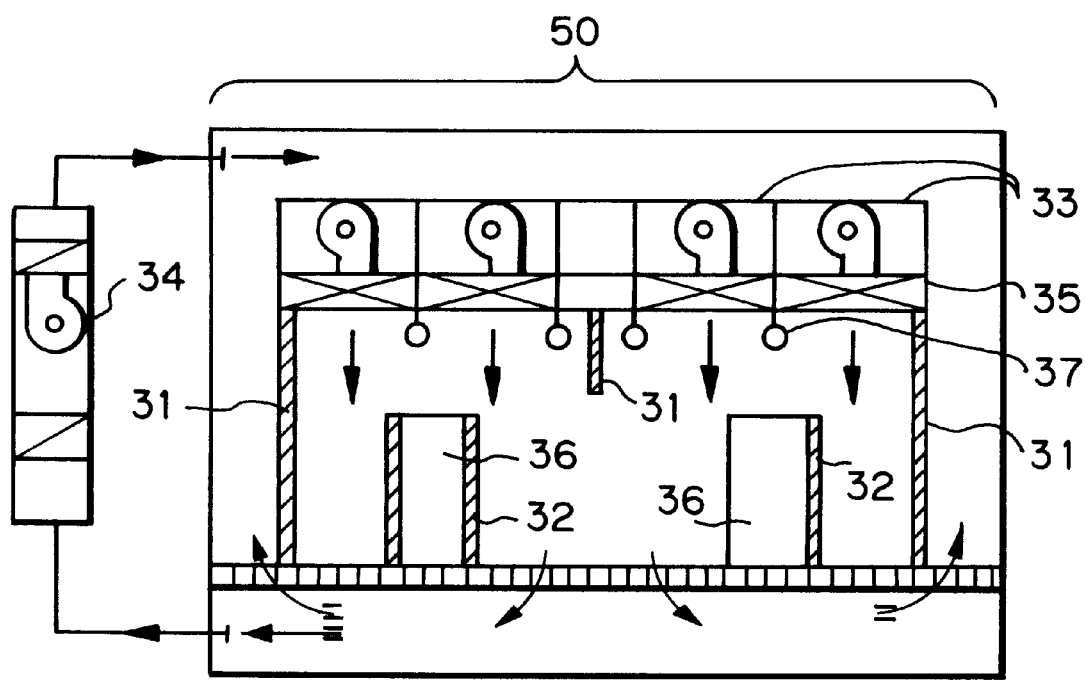
FIG. 14 shows schematically a cleanroom having the apparatus of the invention installed according to still another embodiment.

FIG. 14 is a schematic representation of a cleanroom incorporating the contamination control apparatus of the invention. The cleanroom generally indicated by 50 is a class 100 cleanroom for fabricating semiconductors using vertical laminar flows throughout the working area. A photocatalyst is provided not only on sidewalls 31 of the cleanroom 50 but also on sidewalls of two semiconductor fabrication apparatus 36 and illuminated with the light from fluorescent lamps 37 for treating the organic gases (HC) in the air within the cleanroom. ULPA filters 35 in fan filter units 33 are primarily responsible for removing fine particles (particulates) in order to maintain the cleanliness level of class 100 within the cleanroom 50. A desired film is deposited on wafers by means of the fabrication apparatus 36. Very small amounts of HCs are generated from constituent materials of the cleanroom (e.g. the sealant in the ULPA filters, as well as the sealant, adhesive and synthetic resins in the cleanroom) and from the high-molecular weight materials that compose the fabrication apparatus (as in the wafer cassette). The generated HCs cannot be trapped or removed by the ULPA filters 35 and, in the absence of the photocatalyst, the concentration of HCs in the cleanroom 50 will increase with time. Stated more specifically, the air in the cleanroom 50 is recirculated by means of an air conditioner circulation fan combination 34 in order to achieve energy saving and this will cause an inevitable increase in the HC concentration of the cleanroom 50. The photocatalyst is provided not only on sidewalls 31 of the cleanroom but also on sidewalls 32 of each fabrication apparatus 36. Upon illumination with the fluorescent lamps 37, the photocatalyst exhibits the desired photocatalysis to convert the HCs in the cleanroom to those of low-molecular weight which will not contribute to the increase in contact angle. In the case shown in FIG. 14, the photocatalyst is secured to both sidewalls of the cleanroom and to sidewalls of the fabrication apparatus. If the cleanroom layout permits, the photocatalyst may be provided directly on the fluorescent lamps 37. The photocatalyst used in the illustrated case is a thin $TiO_2$ film deposited on an alumina ($Al_2O_3$) plate. The arrows in FIG. 14 represent the directions of airflows.

Figure 15:
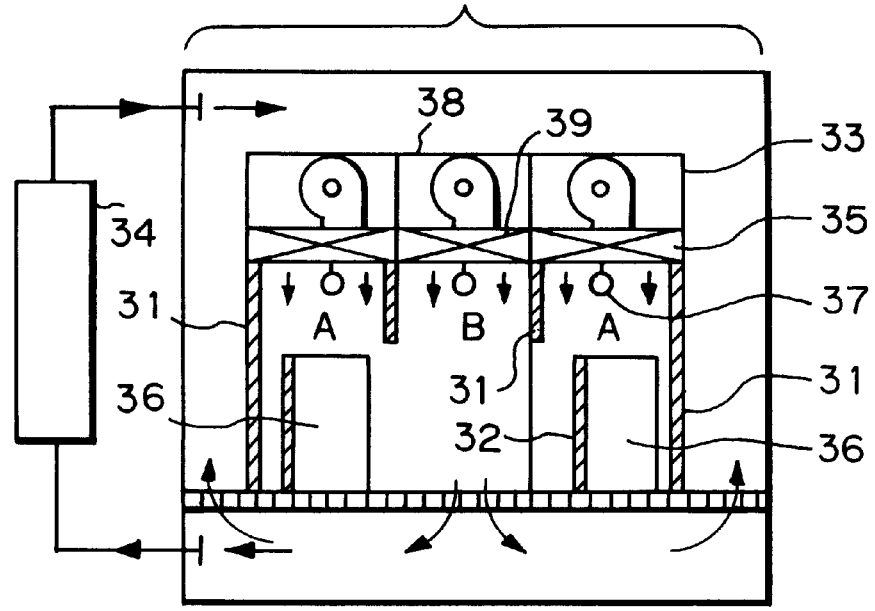
FIG. 15 shows schematically a cleanroom having the apparatus of the invention installed according to a further embodiment.

FIG. 15 shows a cleanroom of a tunnel type for producing semiconductors. A photocatalyst is provided not only on sidewalls 31 of the cleanroom 50 but also on sidewalls 32 of fabrication apparatus for treating the organic gases (HCs) in the air within the cleanroom.

Two fabrication zones A are each separated from a working zone B such that the cleanliness level of class 1,000 is maintained in the working zone B whereas the cleanliness level of class 10 is maintained in each fabrication zone A, thereby ensuring the fabrication of the desired semiconductor products in a highly clean environment. The cleanroom 50 comprises fan filter units 33 for the fabrication zones A, a fan filter unit 38 for the working zone B, and an air conditioner/circulation fan combination 34. Unwanted fine particles (particulates) are removed by both ULPA filters 35 in the fan filter units 33 and a HEPA filter 39 in the fan filter unit 38. Organic gases are generated by the same mechanism as described for the cleanroom shown in FIG. 14 and they cannot be removed by the combination of ULPA and HEPA filters. In addition, the air in the cleanroom 50 is recirculated by means of the air conditioner/circulation fan combination 34 in order to achieve energy saving, so in the absence of the photocatalyst, the concentration of HCs in the cleanroom 50 will increase with time. The photocatalyst is provided not only on sidewalls 31 of the cleanroom but also on sidewalls 32 of each fabrication apparatus 36. Upon illumination with the light from the fluorescent lamps 37, the photocatalyst exhibits the intended photocatalysis to convert the HCs in the cleanroom to those of low-molecular weight which will not contribute to the increase in contact angle. In the case shown in FIG. 15, the photocatalyst is chiefly made of $TiO_2$ and a thin $TiO_2$ film doped with 2 wt % Pt is attached to an alumina ($Al_2O_3$) plate.

Figure 16:
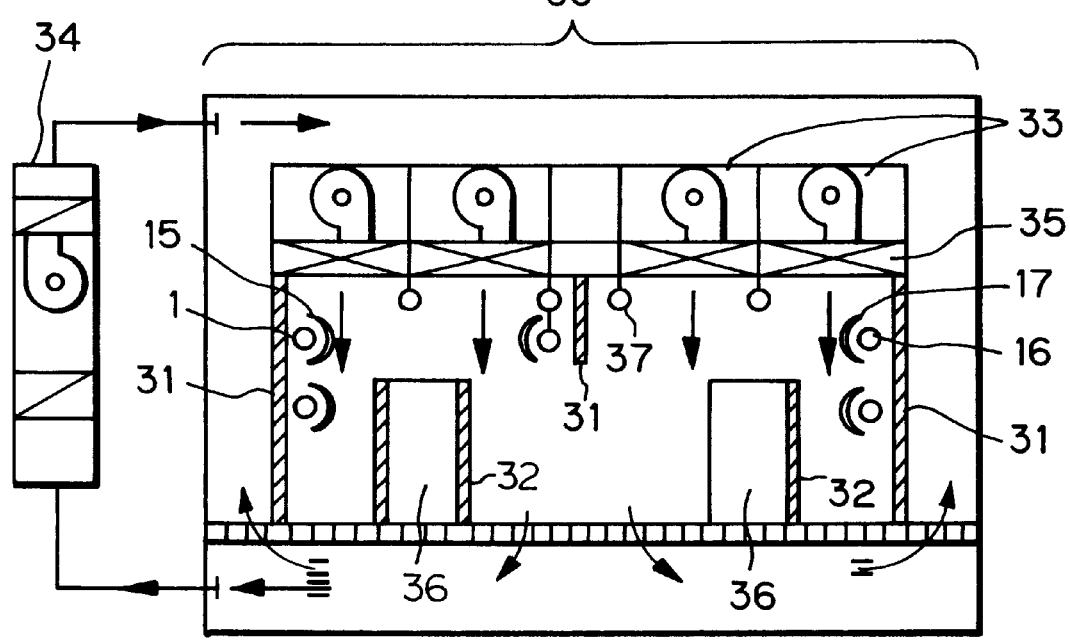
FIG. 16 shows schematically a cleanroom having the apparatus of the invention installed according to a still further embodiment.

FIG. 16 shows a modification of the apparatus shown in FIG. 14, which is characterized in that the photocatalyst is illuminated not only with light from the fluorescent lamp 37 but also with light from dedicated ultraviolet lamps (low-pressure mercury lamps) 1. Shown by 15 is a reflecting surface for ensuring that the photocatalyst is efficiently illuminated with the ultraviolet light from the lamps 1.

The following examples are provided for the purpose of further illustrating the present invention but are in no way to be taken as limiting.

EXAMPLE 1

Samples of a gas having the cleanliness and HC levels that are identified below were placed within a wafer stocker of the layout shown in FIG. 2. The photocatalyst in the stocker was illuminated with ultraviolet light. Measurements were made of the contact angle on the wafers stored in the stocker, and the affinity of the deposited Cr film for the wafers (the adhesion of the Cr film). In addition, the hydrocarbons adsorbed on the wafers in the stocker were identified to determine the concentration of non-methane hydrocarbons (HCs) in the stocker. The same measurements were conducted for the case where no photocatalyst was employed.

Stocker size: 80 L

Light source: Chemical lamp (6 W; with a peak at 360 nm)

Attachment of photocatalyst onto light source: The surface of the chemical lamp was coated with $TiO_2$ by a sol-gel method in a thickness of 100 nm.

Contact angle: Measured by a waterdrop contact angle method using a Model CA-DT of Kyowa Kaimen Kagaku, K.K.).

Film deposition on wafers: Cr film formed in a thickness of 300 nm by sputtering Adhesion of the deposited Cr film: Measured by a scratch test using a Model CSRO2 of RHESCA Corp.

Concentration of non-methane hydrocarbons in the stocker: Measured by gas chromatography (GC)

Hydrocarbons adsorbed on wafers: Identified by GC/MS

Concentrations of contaminants in the sample gas: Particulates: Class 10 (10 particles≧0.5 μm per cubit foot of gas) Non-methane HCs: 1.1 ppm Wafers in the stocker: A 5-inch wafer was cut into pieces of 1 cm×8 cm, subjected to the following preliminary treatments and placed in the stocker.

Preliminary treatments of wafers: Following washing with a detergent and alcohol, the wafers were exposed to uv light under $O_3$ generation.

Results

Figure 17:
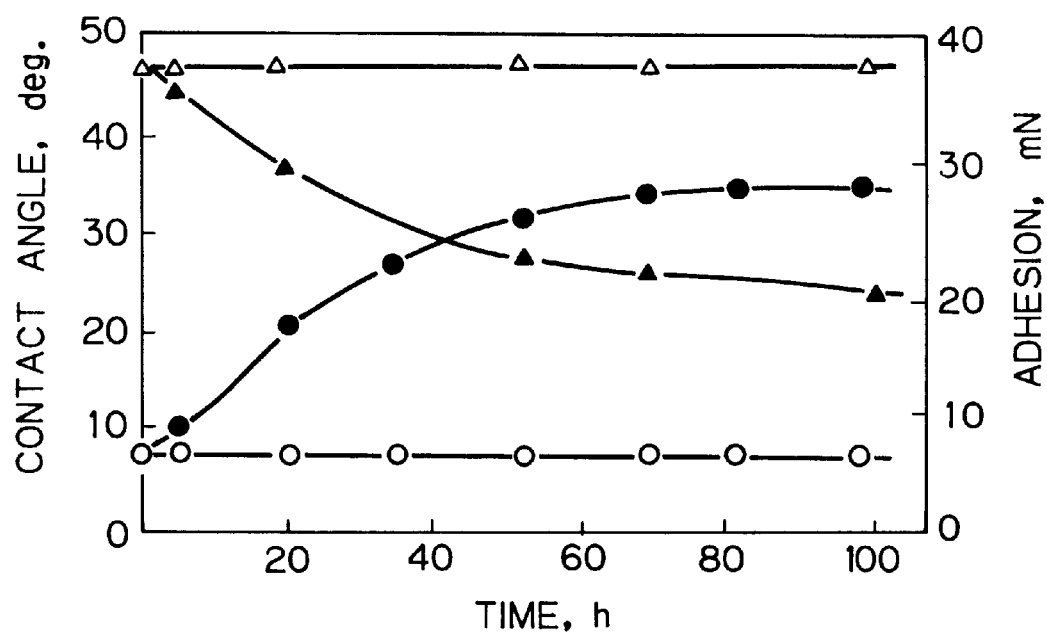
FIG. 17 is a graph showing the time-dependent changes in the contact angle on a substrate and the adhesion of the Cr film deposited on the substrate.

FIG. 17 is a graph showing the changes in contact angle and Cr film adhesion with the lapse of time; the profile of contact angle is represented by -○- in the presence of the photocatalyst and by -●- in its absence, whereas the profile of Cr film adhesion is represented by -△- in the presence of the photocatalyst and by -▲- in its absence. Obviously, no changes occurred in either profile when the photocatalyst was provided. In the case where no photocatalyst was used, the test wafers were recovered after the lapse of 50 hours and the hydrocarbon deposit on the wafers was desorbed by heating; phthalate esters were detected in analysis by GC/MS. No phthalate esters were detected in the case where the photocatalyst was provided. In the positive case for the photocatalyst, the concentration of non-methane HCs in the stocker was kept below 0.1 ppm at all times of measurements (2, 20, 50 and 98 h); in the negative case for the photocatalyst, the result was 0.9–1.1 ppm at the corresponding times of measurements.

EXAMPLE 2

Samples of a gas (cleanroom air) having the cleanliness and HC levels that are identified below were placed within wafer stockers of the layouts shown in FIGS. 6 and 7. The photocatalyst provided over varying surface areas in the stocker was illuminated with ultraviolet light. Measurements were made of the contact angle of the wafers stored in the stocker, and the affinity of the deposited Cr film for the wafers (the adhesion of the Cr film). In addition, the hydrocarbons adsorbed on the wafers in the stocker were identified to determine the concentration of non-methane HCs in the stocker. The same measurements were conducted for the case where no photocatalyst was employed.

Stocker size: 100 L

Light source: Chemical lamp (6 W); with a peak at 360 nm)

Photocatalyst: Alumina plate having a thin $TiO_2$ film attached thereto by a sol-gel method was fixed to both the surface of a light shield and sidewalls of the stocker.

Use area of the photocatalyst: Provided over surface areas of 1–5,000 cm² in the 100-L space of the stocker (the number of lamps was increased as the photocatalyst was provided over an increased area).

Contact angle: Measured by a waterdrop contact angle method using a Model CA-DT of Kyowa Kaimen Kagaku K.K.)

Film deposition on wafers: Cr film formed in a thickness of 300 nm by sputtering Adhesion of the deposited Cr film: Measured by a scratch test using a Model CSRO2 of RHESCA corp.

Concentration of non-methane HCs in the stocker: Measured by gas chromatography (GC)

HCS adsorbed on wafers: Identified by GC/MS

Concentrations of contaminants in the sample gas: Particulates: Class 10 Non-methane HCs: 1.1 ppm Wafers in the stocker: A 5-inch wafer was cut into pieces of 1 cm×8 cm, subjected to the following preliminary treatments and placed in the stocker.

Preliminary treatments of wafers: Following washing with a detergent and alcohol, wafers were exposed to uv light under $O_3$ generation.

Results

Figure 18:
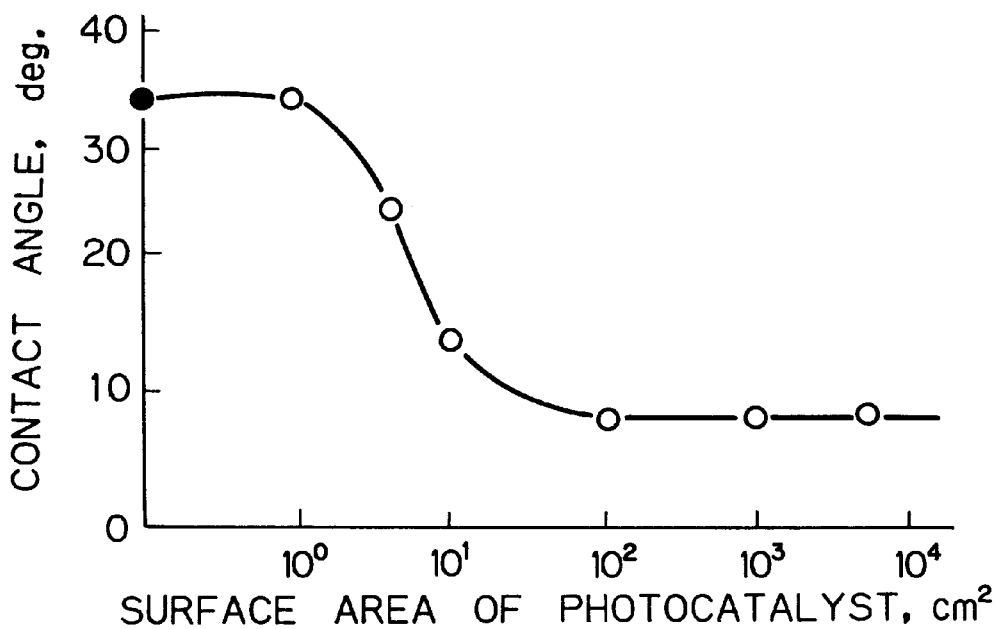
FIG. 18 is a graph showing the change in the contact angle on a substrate as a function of the surface area over which the photocatalyst is provided.
Figure 19:
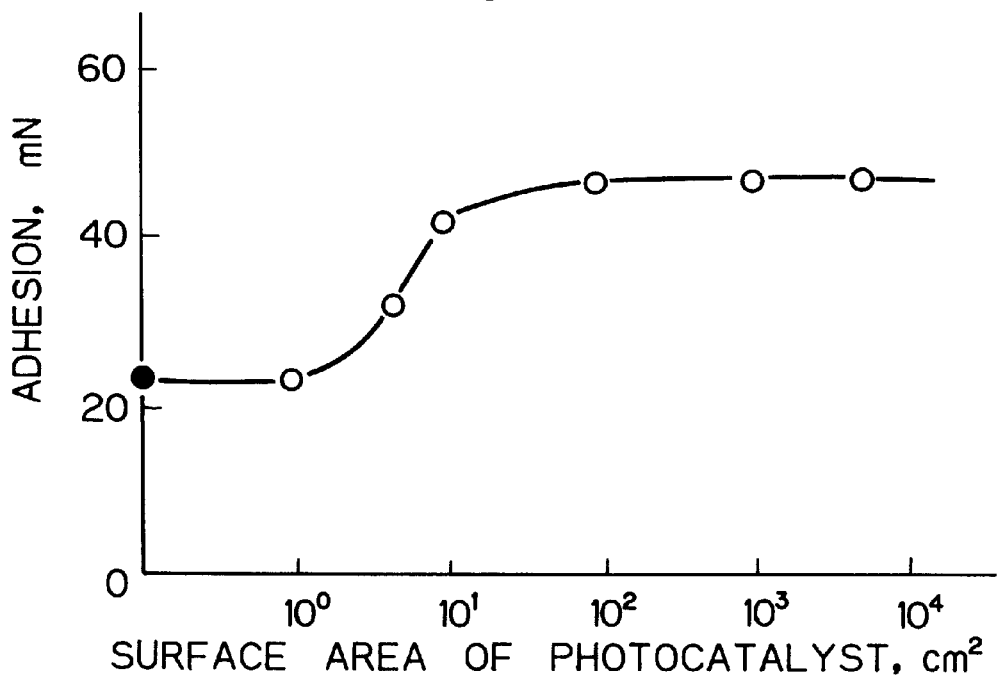
FIG. 19 is a graph showing the change in the adhesion of the Cr film on a substrate as a function of the surface area over which the photocatalyst is provided.

FIG. 18 shows the contact angle after three days of wafer storage as a function of the surface area over which the photocatalyst was provided, and FIG. 19 shows the adhesion of the Cr film on the wafers stored for three days. In the absence of the photocatalyst, the contact angle and the adhesion of the Cr film were 35 degrees and 22 mN, respectively (-●-). After three days of storage, the wafers were recovered and the hydrocarbon deposit on the wafers was desorbed by heating; phthalate esters were detected in analysis by GC/MS of both the case of providing the photocatalyst over an area of 1 cm² and the case where no photocatalyst was provided. No phthalate esters were detected when the photocatalyst was provided over areas of 100 cm² and 1,000 cm². The concentration of non-methane HCs in the stocker after three days of storage was less than 0.1 ppm when the photocatalyst was provided over areas of 100 cm² and 1,000 cm²; in the negative case for the photocatalyst and in the case where it was provided over an area of 1 cm², the concentration of non-methane HCs was below 0.9 ppm.

In the case where the photocatalyst was provided over an area of 100 cm², the stocker was operated for 3,000 hours with the access door being opened and closed five times a day and the contact angle and the adhesion of the Cr film were measured by the same methods as described above. The results were as follows: the increase in contact angle was within 5 degrees and the drop in Cr film adhesion was within 3 mN. Obviously, the initial performance of the wafers was maintained.

EXAMPLE 3

An experiment was conducted with an apparatus having the layout shown in FIG. 12, and measurements were made of the contact angle on the wafers stored in the stocker, and the affinity of the deposited Cr film for the wafers (the adhesion of the Cr film). In addition, the organic gases adsorbed on the wafers were identified. The same measurements were conducted for the case where no photocatalyst was employed.

Wafer cassette: Made of a plastic material (polyester) and capable of containing 10 wafers.

Photocatalyst: Glass plate having a thin $TiO_2$ layer deposited by a sol-gel method was attached to part of a sidewall of the wafer cassette.

Ultraviolet lamp: Low-pressure mercury lamp (10 W)

Contact angle: Measured by a waterdrop contact angle method using a Model CA-DT of Kyowa Kaimen kagaku K.K.

Film deposition on wafers: Cr film formed in a thickness of 300 nm by sputtering Adhesion of the deposited Cr film: Measured by a scratch test using a Model CSR02 of RHESCA Corp.

Organic gases: Identified by GC/MS

Results

Figure 20:
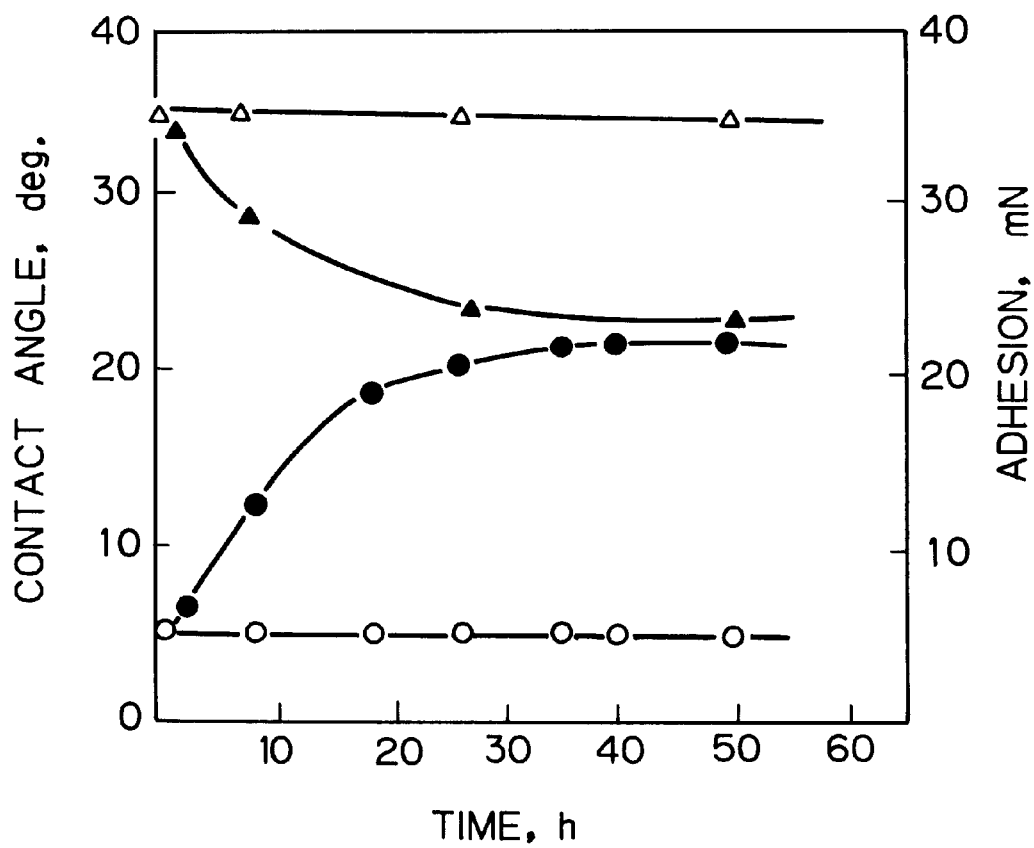
FIG. 20 is another graph showing the time-dependent changes in the contact angle on a substrate and the adhesion of the Cr film deposited on the substrate.

FIG. 20 shows the time-dependent changes of contact angle on the wafers (-○- with the photocatalyst, and -●- without photocatalyst) and the adhesion of Cr film (-Δ- with the photocatalyst, and -▲- without photocatalyst). Obviously, there were no changes in the two factors with the lapse of time when the photocatalyst was used. In the absence of the photocatalyst, wafers were contained in the wafer cassette, taken out 20 hours later and heated to desorb the organic gases. When the desorbed organic gases were analyzed by GC/MS, phthalate esters were detected. No phthalate esters were detected in the presence of the photocatalyst.

EXAMPLE 4

An experiment was conducted using an apparatus having the layout shown in FIG. 14, with wafers being placed in the neighborhood of two fabrication apparatus 36 in the cleanroom 50 (at a position 20 cm distant from each fabrication apparatus and 50 cm above the floor). Measurements were made of the contact angle on the wafers, and the affinity of the deposited Cr film for the wafers (the adhesion of the Cr film). In addition, the organic gases adsorbed on the wafers were identified. The same measurements were conducted for the case where no photocatalyst was employed.

Cleanroom: 30 m$^3$ in capacity and rated and class 10,000

Photocatalyst: Alumina ($Al_2O_3$) plate having a thin $TiO_2$ layer deposited by a sol-gel method was provided on both sidewalls of the cleanroom and sidewalls of each fabrication apparatus Light source: Fluorescent lamp Contact angle: Measured by a waterdrop contact angle method using a Model CA-DT of Kyowa Kaimen Kagaku K.K.

Film deposition on wafers: Cr film deposited in a thickness of 300 nm by sputtering Adhesion of the deposited Cr film: Measured by a scratch test using a Model CSRO2 of RHESCA Corp.

Organic gases: Identified by GC/MS

Results

Figure 21:
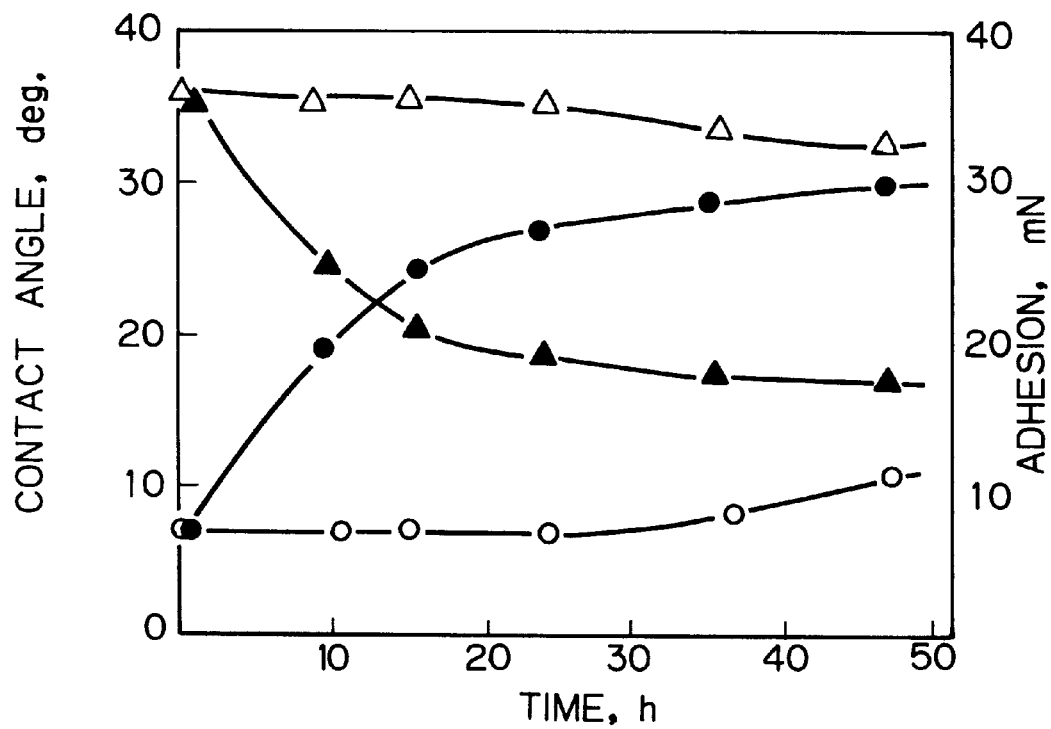
FIG. 21 is yet another graph showing the time-dependent changes in the contact angle on a substrate and the adhesion of the Cr film deposited on the substrate.

FIG. 21 shows the profiles of contact angle on the wafers (-○- in the presence of the photocatalyst and -●- without photocatalyst) and the adhesion of Cr film (-Δ- with the photocatalyst and -▲- without photocatalyst). Obviously, the use of the photocatalyst was effective in preventing the increase in contact angle and maintaining the adhesion of the Cr film. In the absence of the photocatalyst, wafers were exposed to the air within the cleanroom for 20 hours, taken out and heated to desorb the organic gases depositing on the wafers. When the desorbed organic gases were analyzed by GC/MS, phthalate esters were detected. In the presence of the photocatalyst, the generation of phthalate esters was decreased to a hundredth of the amount generated in the absence of the photocatalyst (i.e., 99% drop).

EXAMPLE 5

Using an apparatus having the layout shown in FIG. 14, the same tests were conducted as in Example 4, with the photocatalyst being prepared by doping $TiO_2$ with Pt, Ag, Pd, $RuO_2$ or $Co_3O_4$. The same tests were also conducted for the case where the photocatalyst was solely made of $TiO_2$.

Preparation of Various Kinds of Photocatalyst:

(1) $Pt/TiO_2/Al_2O_3$: Acetic acid (15 g) was added to an aqueous solution (380 ml) of 1 wt % $H_2PtCl_2 \cdot 6H_2O$; to the solution, $TiO_2$-clay (100 g) dispersed in water (15 L) added and the mixture was illuminated with light from a xenon lamp to cause photoreduction, whereupon Pt was supported on the $TiO_2$ particles. The thus obtained $Pt/TiO_2$ was fixed on $Al_2O_3$.

(2) $Ag/TiO_2/Al_2O_3$: $TiO_2/Al_2O_3$ was prepared as in Example 4 and Ag was added by sputtering to give a Ag content of 5 wt %.

(3) $Pd/TiO_2/Al_2O_3$: Pd was added by sputtering as in (2) to give a Pd content of 5 wt %.

(4) $RuO_2/TiO_2/Al_2O_3$: $RuO_2$ was added by sputtering as in (2) to give a $RuO_2$ content of 5 wt %.

(5) $Co_3O_4/TiO_2/Al_2O_3$: $Co_3O_4$ was added by sputtering as in (2) to give a $Co_3O_4$ content of 5 wt %.

Results

Figure 22:
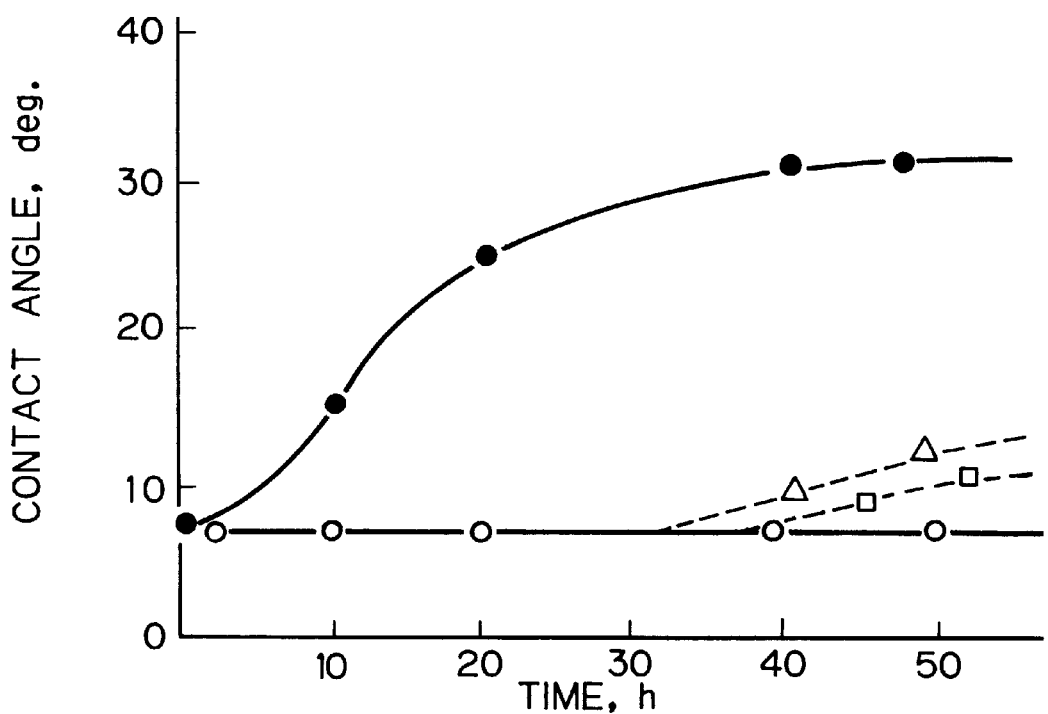
FIG. 22 is a graph showing the time-dependent changes in the contact angle on a substrate.

FIG. 22 is a graph showing the changes in contact angle with the lapse of time. In the graph, the result for the case where no photocatalyst was used is represented by -●-; the result for the case where the photocatalyst was solely made of $TiO_2$ is represented by -Δ-; the result for the case of (4) is represented by -Δ-; and the results for the cases of (1), (2), (3) and (5) are represented by -●-. In the cases of (1), (2), (3) and (5), the adhesion of the Cr film was initially 36 mN, which was maintained even after the passage of 37 and 47 hours. In the absence of any photocatalyst, the wafers were exposed to the air in the cleanroom for 42 hours, taken out and heated to desorb the organic gases depositing on the wafers. When the desorbed organic gases were analyzed by GC/MS, phthalate esters were detected. No phthalate esters were detected when the photocatalyst was composed of $TiO_2$ doped with Pt, Ag, Pd, $RuO_2$ or $Co_3O_4$.

Unitary Assembly of Ultraviolet Radiation Source, Photocatalyst, Photoelectron Emitter and Electrode According to the second aspect of the invention, there is provided an apparatus for cleaning a gas containing both noxious gases and particulates, which is a unitary assembly of at least an ultraviolet radiation source, a photocatalyst, a photoelectron emitter and an electrode, said ultraviolet radiation source being enclosed with the photocatalyst, the photoelectron emitter and the electrode; the apparatus is installed within a space filled with the gas to be cleaned.

Figure 23:
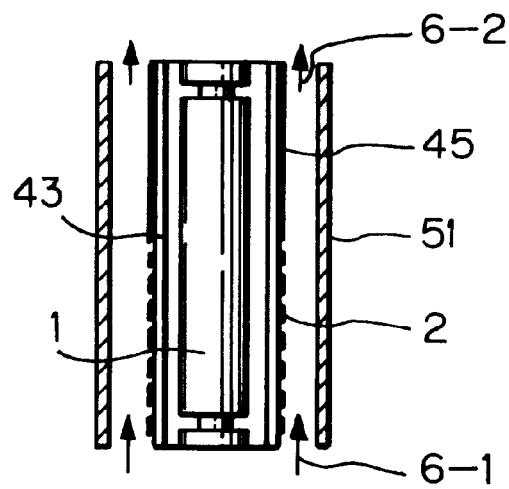
FIG. 23 shows schematically a unit apparatus according to an embodiment of the second aspect of the invention.

FIG. 23 shows schematically an example of the unit apparatus according to the second embodiment of the invention. As shown, the unit apparatus comprises a rod-shaped ultraviolet lamp 1 as an ultraviolet radiation source, a photocatalyst 2 and a photoelectron emitter 45 that are formed on a tubular glass substrate 43 surrounding the lamp 1, and a tubular electrode 51 surrounding the photocatalyst 2 and the photoelectron emitter 45. The photocatalyst 2 is attached as a thin film onto the surface of quartz glass 43 which is transparent to ultraviolet radiation; the photocatalyst 2 is activated upon illumination with ultraviolet radiation so that it performs the necessary photocatalysis to treat the noxious gases in a gaseous feed 6-1 (the photocatalyst 2 thus provides a noxious gas removing zone). The photoelectron emitter 45 is also attached as a thin film to the surface of the quartz glass 43 and, upon illumination with the ultraviolet radiation from the ultraviolet lamp 1, the photoelectron emitter 45 emits photoelectrons radially in a circumferential direction. An electric field is created between the photoelectron emitter 45 (negative polarity) and the electrode 51 (positive polarity) (the photoelectron emitter 45 thus provides a photoelectron emitting zone). The electrode 51 not only creates an electric field but also serves as a means for trapping charged particulates. Stated more specifically, the photoelectrons emitted from the photoelectron emitter 45 provide an electric charge for the suspended particulates in the gaseous feed 6-1 and the resulting charged particulates are trapped by the electrode 51 (the electrode 51 thus provides a particulate removing zone). The present inventors already reported their studies on the mechanism by which particulates are provided with an electric charge by photoelectrons and subsequently trapped [see, for example, AEROSOL KENKYU (Study of Aerosols), Vol. 7, No. 2, pp. 245–247, 1992; Ibid., Vol. 8, No. 3, pp. 239–248, 1993]. Shown by 6-1 in FIG. 23 is the flow of the gaseous feed, and 6–2 represents the flow of the effluent gas.

Figure 24:
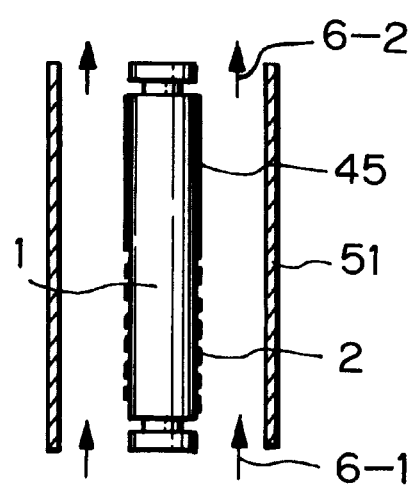
FIG. 24 shows schematically a unit apparatus according to another embodiment of the second aspect of the invention.

FIG. 24 shows schematically another example of the unit apparatus according to the second aspect of the invention. As shown, the photocatalyst 2 and the photoelectron emitter 45 are attached to the surface of the ultraviolet lamp 1, which is surrounded with the tubular electrode 51.

Figure 25:
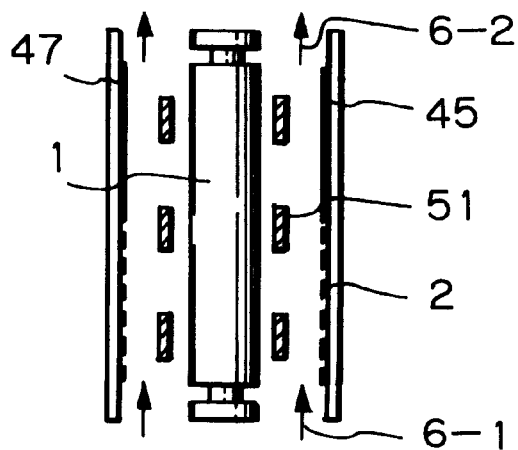
FIG. 25 shows schematically a unit apparatus according to yet another embodiment of the second aspect of the invention.

FIG. 25 shows schematically yet another example of the unit apparatus according to the second aspect of the invention. As shown, the apparatus comprises an ultraviolet lamp 1 surrounded by a mesh electrode 51 which, in turn, is surrounded by a ceramic member 47 having a photocatalyst 2 and a photoelectron emitter 45 attached thereto.

Figure 26:
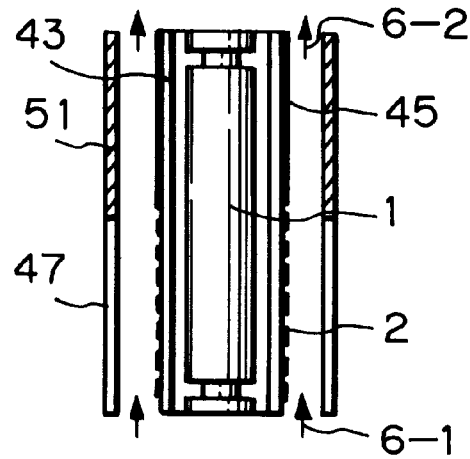
FIG. 26 shows schematically a unit apparatus according to still another embodiment of the second aspect of the invention.

FIG. 26 shows schematically a modification of the unit apparatus shown in FIG. 23, in which the electrode 51 is provided on only the surface opposed to the photoelectron emitter 45. This arrangement may also be adopted by the apparatus shown in FIGS. 24 and 25. The reference numeral 47 in FIG. 26 designates an outer tube (not an electrode).

In FIGS. 23–26, the photocatalyst 2 is provided upstream the flow of the gaseous feed and the photoelectron emitter 45 is provided downstream but this is not the sole positional relationship that can be adopted by the invention and the photoelectron emitter 45 may be provided upstream of the gaseous feed flow whereas the photocatalyst 2 is provided downstream. If desired, the photocatalyst 2 and the photoelectron emitter 45 may be provided in alternate positions.

Figure 27:
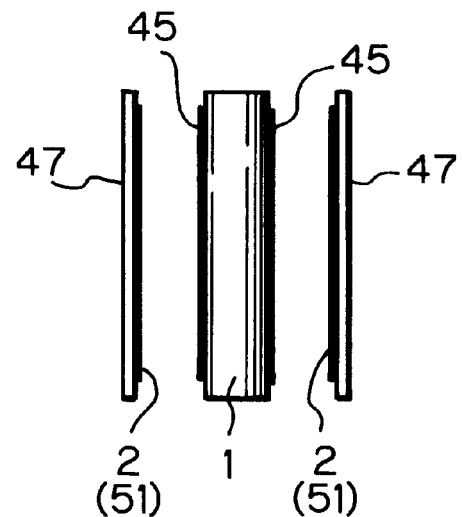
FIG. 27 shows schematically a unit apparatus according to a further embodiment of the second aspect of the invention.
Figure 28:
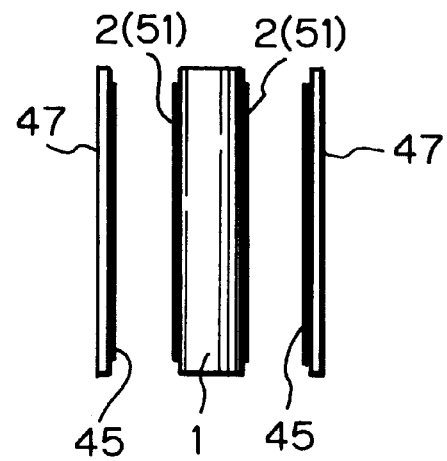
FIG. 28 shows schematically a unit apparatus according to a yet further embodiment of the second aspect of the invention.

FIGS. 27 and 28 show schematically further examples of the unit apparatus according to the second aspect of the invention. In FIG. 27, a photoelectron emitter 45 is attached as a thin film to the surface of an ultraviolet lamp 1 which, in turn, is surrounded by a cylindrical ceramic member 47. The inner circumference of the ceramic member 47 is provided with a thin film of photocatalyst 2 which also serves as an electrode 51. In FIG. 28, a photocatalyst 2 is attached as a thin film to the surface of an ultraviolet lamp 1 and this also serves as an electrode 51. The lamp 1 in turn is surrounded by a cylindrical ceramic member 47 which has a thin film of photoelectron emitter 45 attached to the inner circumference.

Figure 29:
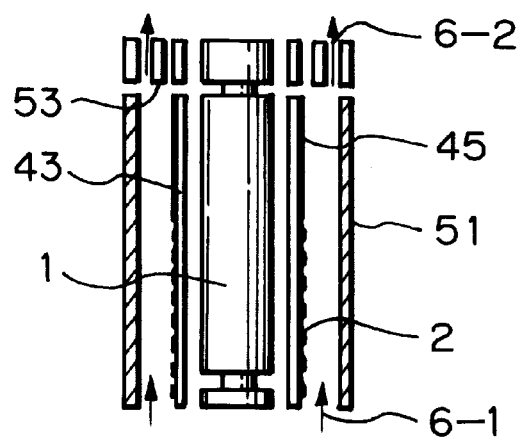
FIG. 29 shows schematically a unit apparatus according to a still further embodiment of the second aspect of the invention.

FIG. 29 shows schematically a modification of the apparatus shown in FIG. 23, in which an additional electrode is provided at the exit in order to ensure more positive trapping of charged particulates. The additional electrode 53 may similarly be provided in the apparatus shown in FIGS. 24–28.

The unit apparatus according to the second aspect of the invention which is intended to clean a gas containing noxious gases and particulates comprises essentially the noxious gas removing zone relying upon the photocatalyst and the particulate removing zone relying upon photoelectrons. The operations of the respective zones will now be described below.

The action of the photocatalyst in the noxious gas removing zone is first discussed. The photocatalyst is excited by illumination with light from the ultraviolet radiation source to ensure that organic gases (non-methane HCs) that contribute to the increase of contact angle are either decomposed to non-contributory forms or converted to stable forms that may be deposited on the substrate surface without adverse effects. The photocatalyst may similarly be made of the semiconductor elements, compounds, alloys or oxides that have been described hereinabove in connection with the first aspect of the invention.

The photocatalyst may be provided as an integral part of the photoelectron emitter or they may be provided as separate entities. The photocatalyst may be attached to the ultraviolet lamp as shown in FIG. 24; alternatively, the ultraviolet radiation source may be surrounded by a glassy material, to the surface of which the photocatalyst is attached as shown in FIG. 23, or the photocatalyst may be attached to a circumferential sidewall opposed to the ultraviolet radiation source. If desired, the photocatalyst may be fixed in a unitary assembly by being coated onto, embedded in or sandwiched between layers of materials of suitable shapes such as a plate, a fluffy mass, a mesh, a honeycomb, a membrane, a sheet and a fiber. For example, a glass plate may be coated with titanium dioxide by a sol-gel method. The photocatalyst may be directly used as a powder but more often than not it is processed into a suitable shape by a well known technique such as sintering, evaporation or sputtering. A suitable arrangement or shape of the photocatalyst may be selected in accordance with various factors including the use, the capacity of the space to be cleaned, the size, geometry and type of the cleaning unit apparatus, the type and shape of the light source, the type of the photocatalyst, the effect to be achieved, and economy.

For example, if the photocatalyst need be attached to the surface of a glass material as shown in FIGS. 23 and 24, exciting light has to reach the surface (or nearby area) of the photocatalyst material in order for it to exhibit the desired photocatalysis; to meet this requirement, the photocatalyst is provided as a thin film. If the photocatalyst is provided on a surface opposed to the lamp 1 as shown in FIG. 25, it need not be a thin film since its surface is directly illuminated with the light from the lamp.

In the present invention, not only the photoelectron emitter but also the photocatalyst is usually operated in an electric field because the action of the photocatalyst is enhanced when it is used in an electric field. Details of the reason for the enhanced action of the photocatalyst used in an electric field are not clear but it may be postulated that the electric field sharpens the potential gradient in the photocatalyst, thereby inhibiting the recombination of photocarriers.

Any type of light source may be used as long as it is capable of causing the photoelectron emitter (to be described below) to emit photoelectrons upon illumination and it emits light at wavelengths for absorption by the photocatalyst; effective light is in the visible and/or ultraviolet range. A well known light source may be used as appropriate for the specific purpose and a mercury lamp may typically be used. If desired, more than one light source may be provided so that the photoelectron emitter is illuminated independently of the photocatalyst.

We now describe the layout and operation of the particulate removing zone which relies upon photoelectrons. The present inventors already proposed a unitary assembly in which an ultraviolet radiation source is surrounded by a photoelectron emitter and an electrode (Japanese Patent Public Disclosure Nos. 68910/1993 and 29373/1994). The photoelectron emitter may be of any type that emits photoelectrons upon illumination with ultraviolet radiation and it has preferably the smallest possible photoelectric work function. From the viewpoints of effectiveness and economy, Ba, Sr, Ca, Y, Gd, La, Ce, Nd, Th, Pr, Be, Zr, Fe, Ni, Zn, Cu, Ag, Pt, Cd, Pb, Al, C, Mg, Au, In, Bi, Nb, Si, Ti, Ta, U, B, Eu, Sn, P and W, as well as compounds, alloys and mixtures thereof are preferred, and these may be used either independently or in combination. In the latter case, physical composites such as amalgam may be employed. Exemplary compounds are oxides, borides and carbides; exemplary oxides include BaO, SrO, CaO, $Y_2O_5$, $Gd_2O_3$, $Nd_2O_3$, $ThO_2$, $ZrO_2$, $Fe_2O_3$, ZnO, CuO, $Ag_2O$, $La_2O_3$, PtO, PbO, $Al_2O_3$, MgO, $In_2O_3$, BiO, NbO and BeO; exemplary borides include $YB_6$, $GdB_6$, $LaB_5$, $NdB_6$, $CeB_6$, $EuB_6$, $PrB_6$ and $ZrB_2$; and exemplary carbides include UC, ZrC, TaC, TiC, NbC and WC. Useful alloys include brass, bronze, phosphor bronze, Ag—Mg alloys (2–20 wt % Mg), Cub—Be alloys (1–10 wt % B) and Ba—Al alloys. Particularly preferred are Ag—Mg, Cub—Be and Ba—Al alloys.

Oxides can be prepared by heating only metal surfaces in air or oxidizing them with chemicals. Alternatively, metal surfaces may be heated prior to use, whereupon oxide layers can be formed that remain stable over an extended period. For example, Mg—Ag alloys may be heated at 300–400° C. in steam to form oxide films on the surface which will remain stable for a prolonged time.

A substance that emits photoelectrons may be attached to another substance, for example, a substance transparent to ultraviolet radiation. In the case shown in FIG. 23, a thin film of Au which is a substance capable of emitting photoelectrons is attached as a thin film to quartz glass which is a substrate, or a material transparent to ultraviolet radiation (see Japanese Patent Public Application No. 295432/1990). In the case shown in FIG. 24, Au is attached as a thin film to the surface of an ultraviolet lamp. The geometry and layout of the photoelectron emitter depend on various factors such as the geometry of the unit apparatus, its layout and the effect to be attained.

In order to emit photoelectrons, the photoelectron emitter may be illuminated with various radiations including not only ultraviolet light but also electro-magnetic waves, lasers and actinic radiations. Ultraviolet is generally preferred from the viewpoints of effectiveness and ease of operation. Depending on the area of application, it is preferred that ultraviolet radiations also have a disinfecting (sterilizing) action. For example, in the biological field, ultraviolet light is preferably combined with far ultraviolet radiation in order to ensure a disinfecting action and high efficiency. Examples of ultraviolet radiation sources that can be used include a mercury lamp, a hydrogen discharge tube, a xenon discharge tube and Lyman discharge tube. In the biological field, the use of an ultraviolet radiation having a disinfecting (sterilizing) wavelength of 254 nm is preferred since it also provides a disinfecting (sterilizing) action.

We now describe the positions and shapes of the photoelectron emitter and the electrode. These members, together with the photocatalyst, surround the ultraviolet radiation source to form a unit apparatus for cleaning a gas containing noxious gases and particulates. The position and the shape of the photoelectron emitter are such that the ultraviolet light emitted from the ultraviolet radiation source is surrounded to ensure that the photoelectron emitter will be illuminated over a sufficiently wide area. Since the ultraviolet light is usually emitted radially in a circumferential direction, the photoelectron emitter may be of any type that can be provided in such a circumferential direction as to surround the emitted ultraviolet radiation. The electrode may assume any position and shape as long as an electric field can be created between the electrode and the photoelectron emitter. The electrode material and its structure may be of any types that are employed in well known electrifying devices. Any electric conductors may be used as the electrode material and examples are wires, bars and plates of tungsten, SUS steels and brass. One or more of these electrode materials may be employed either individually or in combination and provided in such a way as to create an electric field near the photoelectron emitter.

The photoelectron emitter may be provided inward of the electrode as shown in FIGS. 23 and 24; alternatively, the photoelectron emitter may be provided outward of the electrode as shown in FIG. 25; whichever layout may be adopted depending on various factors. The photoelectron emitter may be provided in various forms as already proposed by the present inventors and they include: a plate, a pleat and metal mesh (Japanese Patent Public Disclosure No. 170850/1986); a protective film attached to a substrate (Japanese Patent Application No. 155857/1989); a thin film (Japanese Patent Application No. 278123/1990); and an attachment to a material transparent to ultraviolet radiation (Japanese Patent Application No. 295423/1990). particularly preferred embodiments are as follows: at least part of the photoelectron emitter is a mesh (Japanese Patent Public Disclosure No. 178050/1986); a substance capable of emitting photoelectrons is attached as a thin film to a material transparent to ultraviolet radiation, such as a glass material (Japanese Patent Application No. 295423/1990); and one or more flat or curved plates are used either individually or in appropriate combinations for provision in the photoelectron emitting zone. If a rod-shaped or cylindrical ultraviolet lamp is used as the ultraviolet radiation source, ultraviolet light is emitted radially in a circumferential direction, so more photoelectrons will be emitted as the photoelectron emitter is illuminated with an increased flux of the radial ultraviolet light.

The strength of an electric field is determined by several factors including the concentration of concomitant water and the type of the photoelectron emitter. A preferred field strength is generally from 0.1 V/cm to 2 kV/cm. The distance between the photoelectron emitter and the electrode is preferably the smallest possible since a lower voltage need be applied. The distance of interest is generally within 20 cm, preferably within 5 cm.

Figure 30:
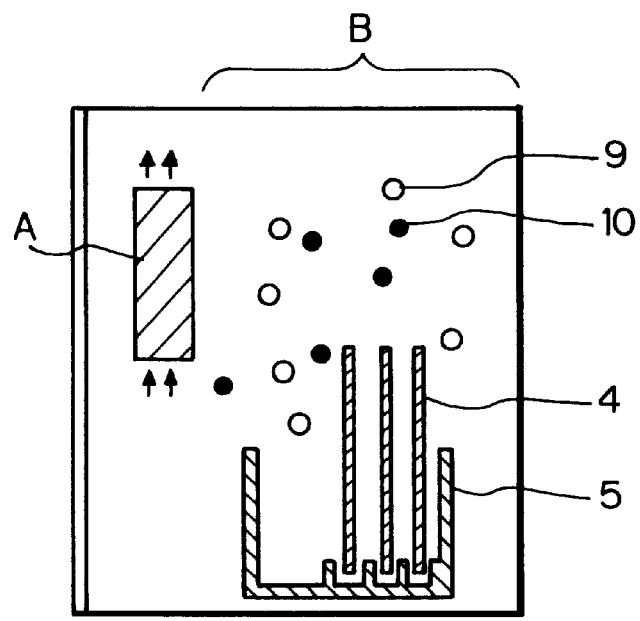
FIG. 30 shows schematically a wafer stocker having installed therein the unit apparatus of the second aspect of the invention.

FIG. 30 shows schematically a wafer stocker at a semiconductor plant having installed therein the unit apparatus shown in FIG. 23. The air within the wafer stocker which provides a closed space is cleaned by means of a unit apparatus A that comprises an ultraviolet lamp (see FIG. 23) provided within the wafer stocker, a photocatalyst 2 and a photoelectron emitter 45 which are provided on a cylindrical glass substrate 43 that surrounds the lamp, and a cylindrical electrode 51 surrounding the photocatalyst 2 and the photoelectron emitter 45. The wafer stocker contains not only hydrocarbons (HCs) 9 as noxious gases which, when deposited on the surface of a wafer 4, will increase the contact angle but also particulates 10 which, when deposited on the wafer, will cause the breakage of interconnections in the conductor patterns, shorting and other defects that will lower the fabrication yield. HCs 9 are decomposed by the catalysis of the photocatalyst 2 upon illumination with ultraviolet radiation or converted to a form that will not increase the contact angle. The particulates 10 are electrified by photoelectrons emitted from the photoelectron emitter 45 upon illumination with ultraviolet radiation; the resulting charged particulates are trapped by the electrode 51 and the air in the space B containing the wafers is cleaned to a very high cleanliness level. HCs 9 and particulates 10 will be transferred from the storage to the unit apparatus A by the gas flows (see 6-1 and 6-2 in FIG. 23) that are caused by a slight temperature difference which is produced between the upper and lower parts of the unit apparatus by illumination with the ultraviolet lamp 1 in the unit apparatus. Thus, the noxious gases and the particulates in the air within the wafer stocker are treated and the air within the wafer stocker maintains a very high cleanliness level that enables wafers and other substrates to be stored without increasing the contact angle and which is rated at class 1 and below. Since the contact angle will not increase on the surface of substrates such as wafers, highly adherent films can be deposited on the substrate surface. If part of the air stream in the stocker is stirred, the particulates can be removed at a faster speed. To this end, various methods may be adopted, such as heating to establish a temperature difference and mechanical stirring. These methods may be employed as appropriate.

In the case shown in FIG. 30, only one unit apparatus is installed within the space to be cleaned for the purpose of treating noxious gases and particulates. Needless to say, more than one unit apparatus may be installed depending on the site of use, the capacity of the space to be cleaned, its geometry and the performance required. Stated more specifically, the unit apparatus shown in FIGS. 23–29 may be installed at one or more locations on the ceiling or sidewalls of the localized space (i.e., the wafer stocker, wafer transport system or cleanroom) as in tube cases shown in FIGS. 1–16.

EXAMPLE 6

A wafer stocker of the layout shown in FIG. 30 was installed in a class, 1,000 semiconductor fabrication plant and a cleaning unit apparatus of the layout shown in FIG. 23 was installed within the stocker. The stocker was supplied with a sample of gas having the chemical analysis shown below and following exposure to ultraviolet radiation, the contact angle on the wafers stored in the stocker, as well as the concentrations of particulates and non-methane HCs within the stocker were measured.

Capacity of stocker: 200 L

Ultraviolet radiation source: Insecticidal lamp (6 W)

Photocatalyst: The surface of cylindrical quartz glass had $TiO_2$ attached as a thin film by a sol-gel method.

Photoelectron emitter: The surface of cylindrical quarts glass had Au attached as a thin film (50 Å).

Electrode material: Cylinder (made of SUS steel) having a diameter 3 cm greater the than the surfaces of the photocatalyst and the photoelectron emitter.

Trap of charged particulates: Also served by the electrode material.

Field voltage: 80 V/cm

Cleaning unit apparatus for treating noxious gases and particulates: See FIG. 23; ultraviolet lamp 1 was surrounded by cylindrical glass substrate 43, to which photocatalyst 2 and photoelectron emitter 45 were attached, with all of these elements being surrounded by tubular electrode 5.

Sample gas (inlet gas): See Table 1 below.

TABLE 1

| Medium gas | Concentration (class) | Non-methane HC (ppm) |
| --- | --- | --- |
| Air | 1,000 | 1.0–1.3 |
| Nitrogen | 1,000 | 0.6–0.8 |

Contact angle: Measured with a waterdrop contact angle meter.

Particulate concentration: Measured with a light scattering particle counter.

Non-Methane HC concentration: Measured by gas chromatography.

The particulate concentration (class) represents the total number of fine particles $\geq 0.1$ μm per cubic foot of gas.

Results

Figure 31:
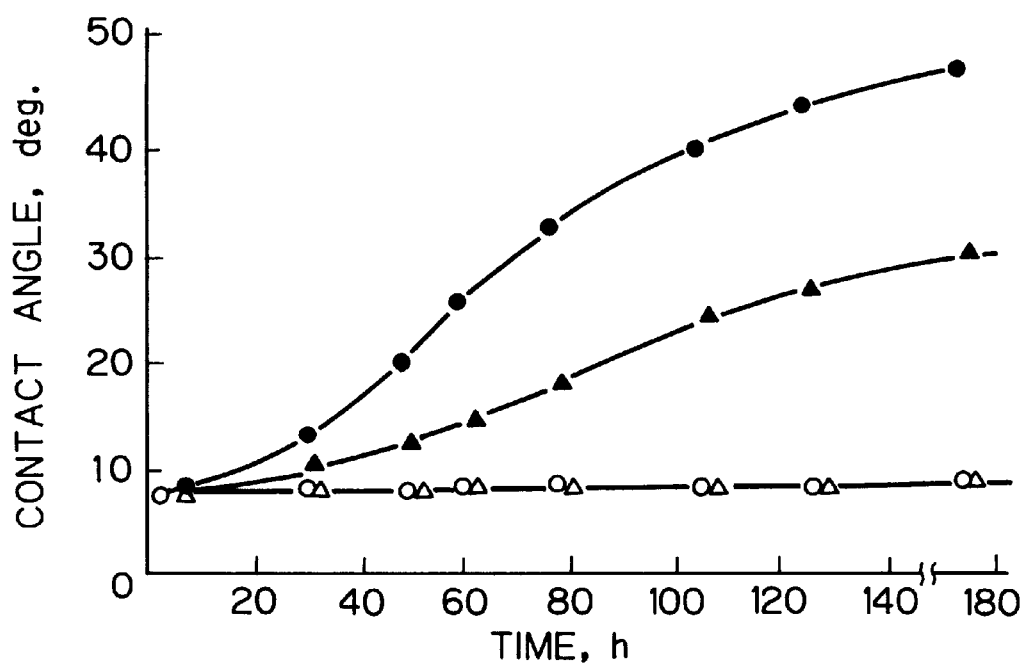
FIG. 31 is a graph showing the change in the contact angle on a substrate as a function of storage time.

The relationship between the contact angle of the wafer stored in the stocker and the time of storage is shown in FIG. 31. The result for the case where the unit apparatus of the invention was supplied with air as the medium gas is represented by -○- and the result for the case where nitrogen was used as the medium gas is represented by -Δ-. The results for the case where no exposure to ultraviolet radiation was made are represented by -●- (with air being used as the medium gas) and -▲- (nitrogen was used). The concentration of non-methane HCs in the stocker was not more than 0.1 ppm at 30 minutes and 30 hours after the start of operation irrespective of whether the medium gas was air or nitrogen. In the absence of ultraviolet irradiation, the concentration of non-methane HCs as measured at 30 minutes and 30 hours after the start of operation was 0.9–1.2 ppm (when air was used as the medium gas) and 0.6–0.7 ppm (when nitrogen was used). The particulate concentration (class) in the stocker at 30 minutes, 30 hours and 180 hours after the start of operation is shown in Table 2 below.

In the absence of ultraviolet irradiation, 80% or more the initial concentration of particulates was detected irrespective of whether the medium gas was air or nitrogen.

TABLE 2

| Medium gas | Initial | 30 min | 30 hour | 180 hour |
| --- | --- | --- | --- | --- |
| Air | 1,000 | <1 | <1 | <1 |
| Nitrogen | 1,000 | <1 | <1 | <1 |

As described on the foregoing pages, the particulates and the noxious gases that are either generated within cleanrooms and other localized spaces or brought into such localized spaces from the external air are effectively removed or rendered harmless to substrates. Hence, the present invention enables semiconductor and liquid-crystal products of high quality to be manufactured at low cost.

What is claimed is:

1. A method for cleaning a gas containing at least one organic compound in a localized space, which method comprises the steps of:

providing a housing having an inner surface defining a localized, closed space within a clean room wherein the localized, closed space is adapted to store at least one of a semiconductor wafer and a semiconductor device;

providing a photocatalyst having a surface area of not less than 50 $cm^2$ per cubic meter of the localized space, wherein at least a portion of the photocatalyst is in the form of a thin film; and irradiating the photocatalyst with light for decomposing said at least one organic compound by the photocatalyst wherein a concentration of non-methane organic compounds in the gas is reduced to not more than 0.2 ppm.

2. A method according to claim 1, wherein said photocatalyst is $TiO_2$.

3. A method according to claim 1, wherein said photocatalyst is $TiO_2$ which is doped with at least one member of the group consisting of Pt, Ag, Pd, $RuO_2$ and $Co_3O_4$.

4. A method according to claim 1, wherein said photocatalyst is formed as a thin film on a surface of a light source.

5. A method according to claim 1, wherein a member containing organic matter is used to define the localized space.

6. A method according to claim 1, wherein a clean box defines the localized space.

7. A method according to claim 1, wherein a stocker defines the localized space.

8. A method according to claim 1, wherein a fluorescent lamp is used to irradiate the photocatalyst.

9. A method according to claim 1, wherein said photocatalyst is formed as a thin film on a surface of a member defining the localized space.

10. A method according to claim 1, wherein the photocatalyst has a surface area of 100 to 10,000 $cm^2$ per cubic meter of the localized space.

11. A method according to claim 1, wherein the photocatalyst has a surface area of 500 to 5,000 $cm^2$ per cubic meter of the localized space.

12. The method of claim 1, further comprising storing at least one of a semiconductor wafer or a semiconductor device in the localized, closed space in the housing.

13. The method of claim 1, wherein the surface area of the photocatalyst is not more than 50,000 $cm^2$ per cubic meter of the localized space.

14. The method of claim 1, wherein the thin film is on said inner surface.

15. A method according to claim 1, wherein the organic compounds contain —CO— and —COO— bonds.

16. An apparatus for cleaning a gas in a localized space, comprising:

a housing having an inner surface defining a localized, closed space in a clean room wherein the localized, closed space is adapted to store at least one of a semiconductor wafer and a semiconductor device;

a photocatalyst being disposed in the housing and having a surface area of not less than 50 $cm^2$ per cubic meter of the localized space; and a light source for irradiating an ultraviolet radiation onto the photocatalyst;

whereby, upon irradiating an ultraviolet radiation onto the photocatalyst, a concentration of non-methane organic compounds in a gas in the localized space from at least materials in said space reduces to not more than 0.2 ppm, wherein at least a portion of the photocatalyst is in the form of a thin film.

17. An apparatus according to claim 16, wherein said housing has a sidewall and a ceiling, and the photocatalyst is formed as a thin film onto the sidewall and/or the ceiling of the housing.

18. An apparatus according to claim 16, wherein said photocatalyst is formed as a thin film onto a surface of the light source.

19. An apparatus according to claim 16, wherein the housing has a door.

20. An apparatus according to claim 16, wherein the photocatalyst has a surface area of 100 to 10,000 $cm^2$ per cubic meter of the localized space.

21. An apparatus according to claim 16, wherein the photocatalyst has a surface area of 500 to 5,000 $cm^2$ per cubic meter of the localized space.

22. An apparatus according to claim 16, wherein the apparatus is a clean box.

23. An apparatus according to claim 16, wherein the apparatus is a stocker.

24. The apparatus of claim 16, wherein the surface area of the photocatalyst is not more than 50,000 $cm^2$ per cubic meter of the localized space.

25. The apparatus of claim 16, wherein the thin film is on said inner surface.

26. An apparatus according to claim 16, wherein the organic compounds contain —CO— and —COO— bonds.

27. The apparatus of claim 16, comprising:

a sidewall structure comprising a first open end and a second open end and defining a bore extending from the first open end to the second open end;

wherein the light source is disposed in the bore of the sidewall structure;

a photoelectron emitter operatively connected to at least one of the photocatalyst and the light source; and an electrode for forming an electric field with the photoemitter.

28. An apparatus according to claim 27, further comprising said housing defining said localized space wherein said photocatalyst is disposed in the housing and has a surface area of 50 to 50,000 $cm^2$ per cubic meter of the localized space.

29. An apparatus according to claim 27, further comprising said housing defining said localized space wherein the photocatalyst has a surface area of 100 to 10,000 $cm^2$ per cubic meter of the localized space.

30. An apparatus according to claim 27, further comprising said housing defining said localized space wherein the photocatalyst has a surface area of 500 to 5,000 $cm^2$ per cubic meter of the localized space.

31. An apparatus according to claim 27, wherein said photocatalyst is disposed in an upstream of said photoelectron emitter.

32. An apparatus according to claim 27, wherein said photocatalyst serves as said electrode.

33. An apparatus according to claim 27, wherein the apparatus is in a form of an assembly unit.

34. An apparatus according to claim 27, wherein the electrode serves as the sidewall structure.

35. An apparatus according to claim 27, wherein the sidewall structure comprises an electrically insulating material.

36. An apparatus according to claim 35, wherein the photocatalyst, serving as the electrode, is coated onto an inner surface of the sidewall structure.

37. An apparatus according to claim 27, wherein the light source and the photoelectron emitter are disposed in the bore of the sidewall structure.

38. An apparatus according to claim 27, further comprising an additional electrode serving as a trap and being disposed in a downstream of the photoelectron emitter.

39. An apparatus according to claim 27, further comprising an additional electrode serving as a trap and being disposed in a downstream of the photoelectron emitter.

40. The apparatus of claim 27, wherein the sidewall structure comprises cylindrical configurations.

* * * * *